US008085314B2

(12) United States Patent  
Iguchi et al.

(10) Patent No.: US 8,085,314 B2
(45) Date of Patent: Dec. 27, 2011

(54) IMAGE PROCESSING APPARATUS, IMAGE PROCESSING SYSTEM, IMAGE PROCESSING METHOD, STORAGE MEDIUM, AND PROGRAM

(75) Inventors: Ryosuke Iguchi, Kanagawa (JP); Makoto Torigoe, Tokyo (JP); Shigeru Mizoguchi, Kanagawa (JP); Yuji Akiyama, Kanagawa (JP); Manabu Yamazoe, Tokyo (JP); Takashi Fujita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 7 days.

(21) Appl. No.: 12/545,202

(22) Filed: Aug. 21, 2009

(65) Prior Publication Data

US 2009/0309996 A1 Dec. 17, 2009

Related U.S. Application Data

(63) Continuation of application No. 10/386,714, filed on Mar. 13, 2003, now Pat. No. 7,616,234.

(30) Foreign Application Priority Data

Mar. 15, 2002 (JP) ................................. 2002-072165
Mar. 5, 2003 (JP) ................................. 2003-058490

(51) Int. Cl.
*H04N 5/235* (2006.01)
*H04N 9/73* (2006.01)
*G03B 7/00* (2006.01)
*G06K 9/00* (2006.01)

(52) U.S. Cl. ............ 348/223.1; 348/362; 382/162; 382/166; 382/167

(58) Field of Classification Search .............. 348/223.1, 348/236, 231.99, 222.1, 333.01–333.12; 382/162, 166, 167

See application file for complete search history.

(56) References Cited

U.S. PATENT DOCUMENTS

| 4,589,755 | A |   | 5/1986  | Maitani et al. ............... 354/431 |
| 5,016,039 | A | * | 5/1991  | Sosa et al. ..................... 396/50 |
| 5,414,537 | A |   | 5/1995  | Omura et al. ................ 358/518 |
| 5,528,293 | A |   | 6/1996  | Watanabe ..................... 348/231 |
| 6,097,430 | A |   | 8/2000  | Komiya et al. ............... 348/218 |
| 6,608,926 | B1 |  | 8/2003  | Suwa et al. ................... 382/162 |
| 6,628,825 | B1 |  | 9/2003  | Yamazoe et al. ............. 382/167 |
| 6,628,830 | B1 |  | 9/2003  | Yamazoe et al. ............. 382/168 |
| 6,657,658 | B2 |  | 12/2003 | Takemura ................ 348/207.99 |
| 6,683,650 | B1 | * | 1/2004 | Yamamoto et al. ...... 348/333.12 |
| 6,694,051 | B1 |  | 2/2004  | Yamazoe et al. ............. 382/167 |
| 7,242,800 | B2 |  | 7/2007  | Iguchi et al. ................. 382/167 |
| 7,616,234 | B2 | * | 11/2009 | Iguchi et al. ............... 348/223.1 |
| 2001/0020978 | A1 |  | 9/2001 | Matsui et al. ................ 348/222 |
| 2001/0028398 | A1 |  | 10/2001 | Takahashi ..................... 348/232 |
| 2002/0030797 | A1 | * | 3/2002 | Enomoto ....................... 355/18 |

* cited by examiner

*Primary Examiner* — Nhan T Tran
*Assistant Examiner* — Tuan Le
(74) *Attorney, Agent, or Firm* — Fitzpatrick, Cella, Harper & Scinto

(57) ABSTRACT

In an image processing apparatus which can always provide an excellent processed image, an analysis unit analyzes condition information representing a condition at a time when an image is obtained and being included in image information, and determines an algorithm of an image correction process for the image based on the analyzed result.

22 Claims, 18 Drawing Sheets

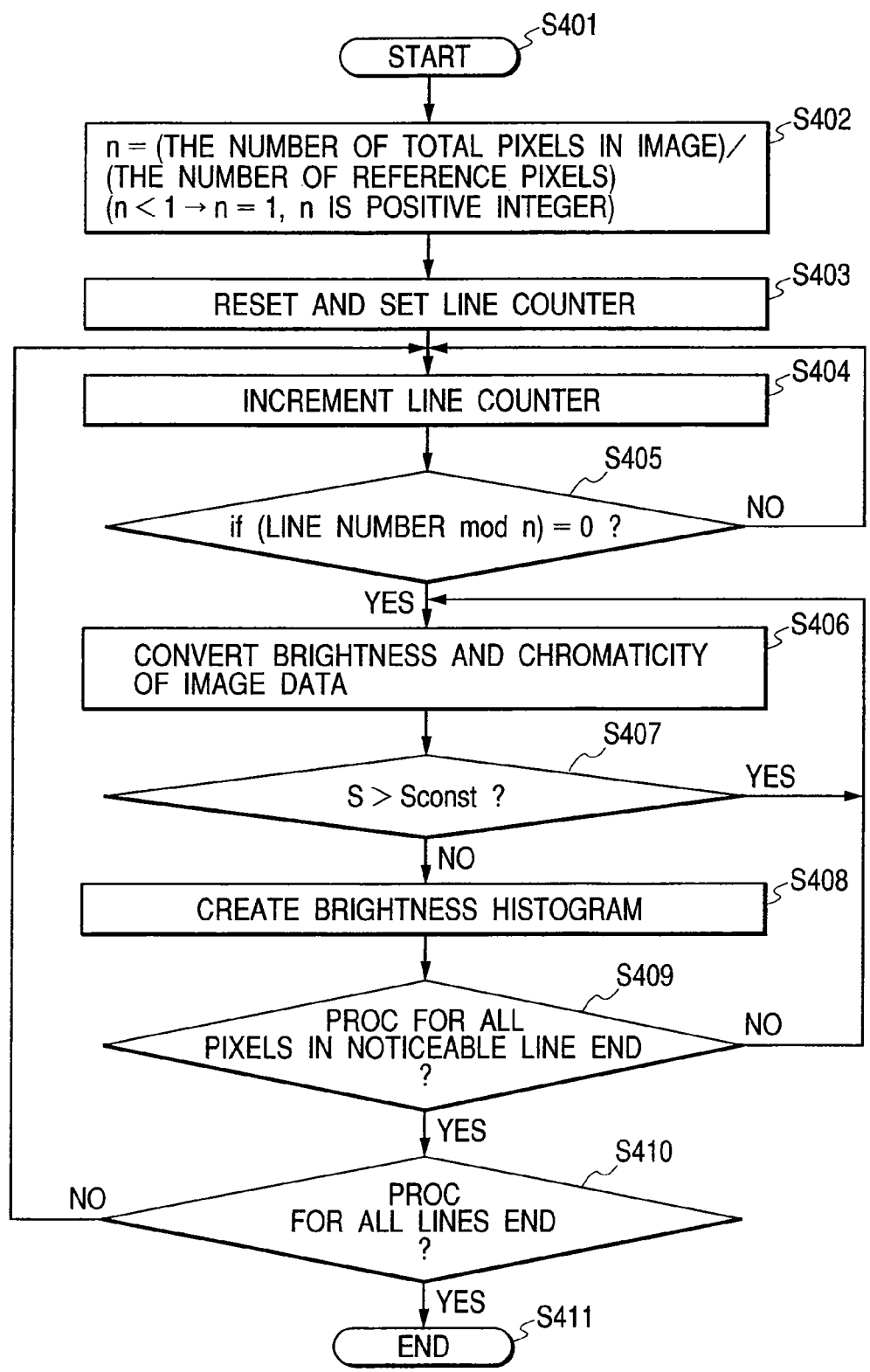

FIG. 13

| HLP | BALANCE OF HISTOGRAM (S128) | SDP | CORRECTION GRADATION CURVE |
|---|---|---|---|
| —200 | 0—60 | 0—10 | CUT OFF HIGH BRIGHTNESS AREA ≥ 230 |
| | | 11—30 | S-CURVE |
| | | 31— | CURVE OF $\gamma = 0.7$ |
| | 61—100 | 0—50 | S-CURVE |
| | | 51— | CUT OFF LOW BRIGHTNESS AREA ≤ 50, AND MULTIPLY $\gamma = 0.9$ |
| 201—230 | 0—30 | 0—40 | CUT OFF HIGH BRIGHTNESS AREA ≥ 240 |
| | | 41— | CURVE OF $\gamma = 0.8$ |
| | 31—60 | 0—5 | CURVE OF $\gamma = 1.2$ |
| | | 6—20 | S-CURVE |
| | | 21— | CUT OFF LOW BRIGHTNESS AREA ≤ 20, AND MULTIPLY $\gamma = 0.9$ |
| | 61—100 | 0—50 | CURVE OF $\gamma = 0.8$ |
| | | 51— | S-CURVE |
| 231—255 | 0—15 | 0—30 | CUT OFF HIGH BRIGHTNESS AREA ≥ 230 |
| | | 31—50 | CURVE OF $\gamma = 0.8$ |
| | | 51— | CUT OFF LOW BRIGHTNESS AREA ≤ 50, AND MULTIPLY $\gamma = 0.9$ |
| | 16—50 | 0—8 | CUT OFF HIGH BRIGHTNESS AREA ≥ 230 |
| | | 9—20 | S-CURVE |
| | | 21— | CURVE OF $\gamma = 1.1$ |
| | 51—100 | 0—10 | CURVE OF $\gamma = 1.2$ |
| | | 11— | CURVE OF $\gamma = 0.9$ |

IMAGE PROCESSING APPARATUS, IMAGE PROCESSING SYSTEM, IMAGE PROCESSING METHOD, STORAGE MEDIUM, AND PROGRAM

This is a continuation of U.S. patent application Ser. No. 10/386,714, filed Mar. 13, 2003, now allowed.

BACKGROUND OF THE INVENTION

1. Field of the Invention

The present invention relates to an image processing apparatus, an image processing system and an image processing method which are all used in an apparatus or a system which performs an image correction process to print and output by a printer digital image data shot and obtained by, e.g., a digital still camera or the like, to a computer-readable storage medium which stores a program for executing the image processing method, and to the program itself.

2. Related Background Art

In recent years, for example, a digital still camera is popularized, whereby an image shot by the digital still camera can be easily digitized. In particular, a chance of handling and treating a photographic image (i.e., an image seen like a photograph) as digital image data increases on a personal computer. Moreover, by using various application programs (software) on the personal computer, the digital image data representing the photographic image can be easily processed and edited.

On one hand, a full-color hard copy technique rapidly develops. Particularly, in a print technique based on an ink-jet print system, a technique to reduce graininess of ink dots improves, whereby an image quality of the print output in this print technique becomes equivalent to an image quality of a silver-salt photograph. Furthermore, this print technique is widely used because it is relatively simple.

According to such a technical background as described above, it is required enabling to easily print the digital image data shot and obtained by the digital still camera. Furthermore, in regard to an image correction process to be performed in case of printing and outputting the image data, the need for an automatic image correction process in which an excellent image-corrected image can be obtained by using the application programs on the personal computer increases instead of a manual image correction process in which complicated functions are used.

Consequently, as a method of performing image processes such as the image correction process and the like in case of printing and outputting the image data so as to obtain an excellent output result, for example, a method of analyzing a scene of the shot image and then automatically performing the image correction based on the analyzed result, and other various methods are proposed.

Furthermore, for example, a method of performing so-called "density correction" which is the correction to prevent that the shot image is too bright (too thin) or too dark (too thick) when this image is printed and output is proposed. Moreover, a method of performing so-called "image correction" which is the correction to correct an inappropriate shot image including color fog, underexposure (defective lightness and/or contrast), defective saturation or the like and an image with the color balance being defective due to color fog or the like is proposed.

As a structure to perform the automatic image correction in both the method of performing "density correction" and the method of performing "image correction", a structure which analyzes the image to be processed (also called an original image or a process-target image hereinafter) by using a histogram on which the numbers of pixels of each brightness value of a brightness signal in the original image have been accumulated and then corrects the original image on the basis of the analyzed result is applied.

Furthermore, the digital still camera side has a function to be able not only to record the shot and obtained image as the digital image data in a storage medium such as a memory card or the like but also to record additional information representing a shooting (or photographing) condition at a time of image shooting together with the digital image data in the storage medium.

Here, it is assumed that the process-target image is shot by the digital still camera, the shot and thus obtained process-target image is analyzed, the scene of the analyzed process-target image is further analyzed, and the automatic image correction of the process-target image is performed on the basis of the analyzed result. In this case, basically, the automatic image correction is performed so that the images which are thought to be logically optimum (i.e., standard images) are printed and output respectively for all of the process-target images.

Incidentally, in such a color correction and a lightness correction, it is often the case that the image process is statistically performed by using the histogram of the image, that is, the optimum correction in all the images cannot necessarily be performed on the basis of the analysis of only the image data. In other words, more precise and strict judgment can be performed if white balance information and exposure information are used respectively for the color correction and the lightness correction.

Furthermore, unlike the manual image correction that a user manually corrects the process-target image by using the application program on the personal computer while confirming it displayed on the monitor of this computer, there is the fear in the automatic image correction that the correction to obtain a standard image is performed against user's intention at the time when obtaining the process-target image (i.e., at the time of shooting the process-target image).

For example, even if the user intentionally sets a manual mode and then shoots an image under an exposure condition to lighten or darken the image, the obtained light image is corrected to make it rather darker and the obtained dark image is corrected to make it rather lighter. That is, in this case, the image obtained in the manual mode is output as an image having appropriate lightness against user's intention. In other words, any process-target image is corrected and output as the image having the same lightness.

Furthermore, even if the user intentionally changes a white balance of the digital still camera to aim at a specific effect and then shoots an image based on the changed white balance, the shot image obtained is corrected to have an optimum color balance (i.e., not the changed white balance).

SUMMARY OF THE INVENTION

The present invention is made in order to solve such a drawback as above, and an object thereof is to provide an image processing apparatus, an image processing system and an image processing method which all can provide an excellent processed image, a computer-readable storage medium which stores a program for executing the image processing method, and the program itself.

In order to achieve the above object, the present invention is characterized by providing an image processing apparatus which performs an image process to image information including condition information representing a condition at a time when an image is obtained, comprising:

an analysis means for analyzing the condition information;

a processing determination means for obtaining a color correction amount of the image according to a value representing a level of color balance and a lightness correction amount of the image according to a value representing a level of lightness on the basis of an analysis result of the analysis means, and determining an image processing condition from the obtained amounts;

a processing means for performing, to the image information, the process according to the image processing condition determined by the processing determination means; and a notification means for, in a case where the image is obtained based on manual setting of an image obtainer, notifying whether or not to perform the process at a time of the process by the processing means.

Other features of the present invention will be apparent from the following description taken in conjunction with the accompanying drawings.

BRIEF DESCRIPTION OF THE DRAWINGS

FIG. 4 is a flow chart showing a procedure to create a brightness histogram;

FIG. 5A shows an ideal color solid, and FIG. 5B shows a color solid before an image in question is not yet subjected to the color balance correction;

FIG. 7A shows a concept of overexposure, FIG. 7B shows a concept of underexposure, FIG. 7C shows an example of overexposure, and FIG. 7D shows an example of underexposure;

FIG. 13 is a diagram showing contents of a table used in the gradation curve judgment process and for explaining how to determine a gradation curve according to a kind of image;

DETAILED DESCRIPTION OF THE PREFERRED EMBODIMENTS

Hereinafter, the embodiment of the present invention will be described with reference to the accompanying drawings.

First Embodiment

Figure 1:
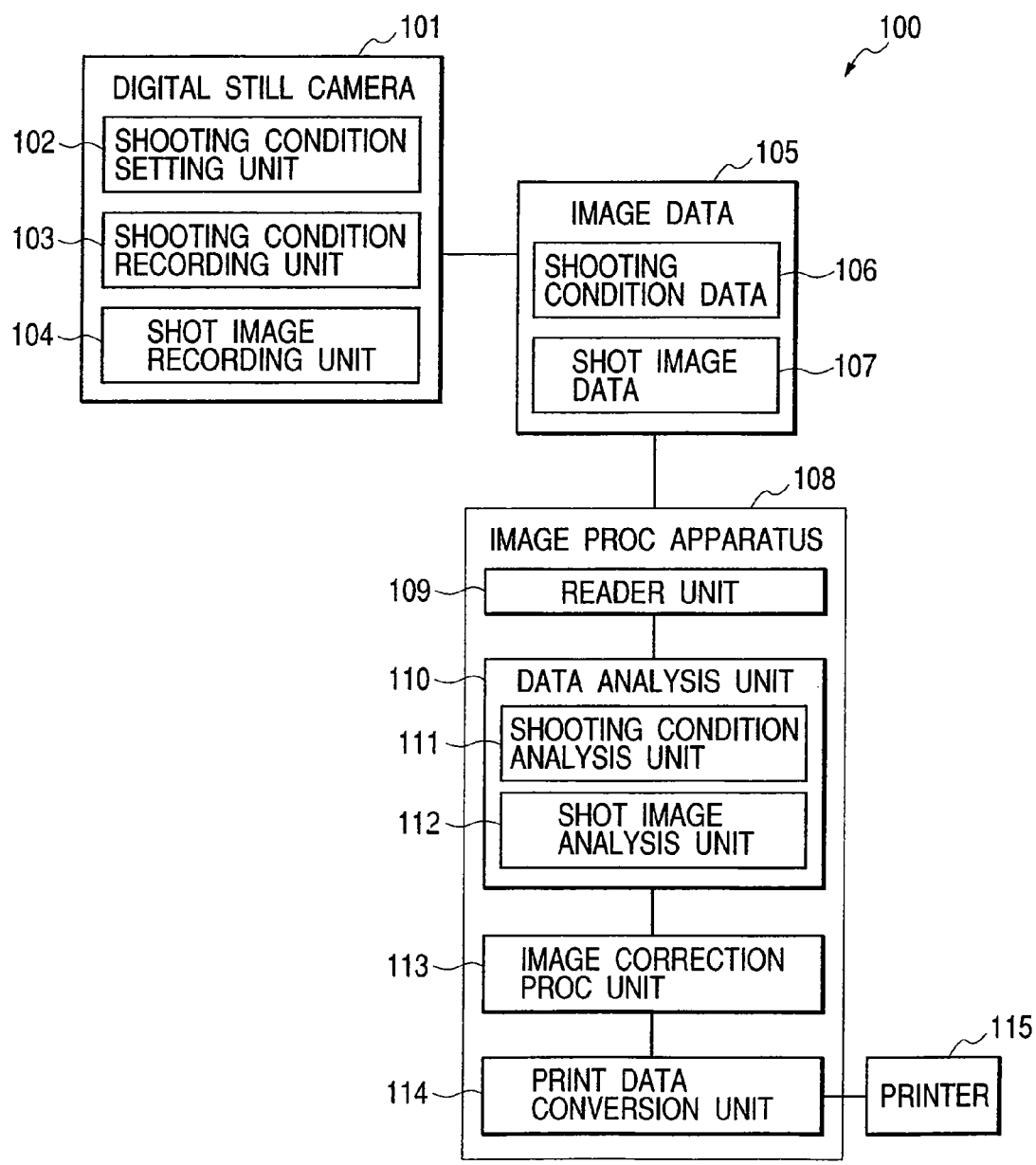
FIG. 1 is a block diagram showing the structure of an image print system to which the first embodiment of the present invention is applied.

The present invention is applied to, e.g., an image print system 100 shown in FIG. 1.

In the image print system 100 according to the present embodiment, particularly, information (additional information) representing a shooting (or photographing) condition and added to process-target image data obtained by shooting a process-target image with a digital still camera 101 is first analyzed, and image correction of the process-target image data is automatically performed on the basis of the analyzed result, whereby a high-quality photographic image print result in which user's intention at the time when obtaining the process-target image data is sufficiently reflected can be provided.

Hereinafter, the structure and operation of the image print system 100 according to the present embodiment will be explained concretely.

(Structure of Image Print System 100)

As shown in FIG. 1, the image print system 100 includes the digital still camera 101, an image processing apparatus 108 and a printer 115.

The digital still camera 101 obtains shot image data 107 through a shooting operation, and then outputs to the image processing apparatus 108 image data 105 including shooting condition data (additional information) 106 in the shooting operation and the shot image data 107. To that end, the digital still camera 101 includes a shooting condition setting unit 102, a shooting condition recording unit 103 and a shot image recording unit 104.

The shooting condition setting unit 102 sets various shooting conditions necessary for the shooting operation.

The shooting condition recording unit 103 records the shooting condition data 106 set by the shooting condition setting unit 102, in the image data 105 (i.e., the data to be output to the image processing apparatus 108).

The shot image recording unit 104 records the shot image data 107 obtained by the shooting operation according to the shooting condition set by the shooting condition setting unit 102, in the image data 105.

Here, as a method of supplying the image data 105 to the image processing apparatus 108, it is possible to adopt a data transfer method using a communication line, a method of recording the data in an arbitrary recording medium or storage medium, or the like.

The image processing apparatus 108 which consists of, e.g., a personal computer activates a predetermined application program to perform the image correction process to the shot image data 107 of the image data 105 sent from the digital still camera 101, and cause the printer 115 to print and output the processed data.

Consequently, the image processing apparatus 108 is equipped with a reader unit 109, a data analysis unit 110 including a shooting condition analysis unit 111 and a shot image analysis unit 112, an image correction processing unit 113, and a print data conversion unit 114. Here, it should be noted that the function of each of the above structural components 109 to 114 is achieved by activating the predetermined application program.

The reader unit 109 reads the image data 105 from the digital still camera 101.

The data analysis unit 110 causes the shooting condition analysis unit 111 to analyze the shooting condition data 106 included in the image data 105 obtained by the reader unit 109, and also causes the shot image analysis unit 113 to analyze the shot image data 107 included in the image data 105 obtained by the reader unit 109. Then, the data analysis unit 110 selects an image correction algorithm based on the analyzed results.

The image correction processing unit 113 performs the image correction process to the shot image data 107 according to the image correction algorithm selected by the data analysis unit 110.

More specifically, for example, in a case where the shot image analysis unit 112 analyzes a brightness value and a brightness distribution on the basis of the signal value of the shot image data 107, the characteristic of the shot image data 107 is first recognized based on the analyzed result, an optimum correction condition corresponding to the analyzed result is determined, and the image correction algorithm based on the determined condition is then selected.

That is, the image correction algorithm is finally determined in accordance with the algorithm determined based on the analyzed result of the shooting condition data 106 by the shooting condition analysis unit 111 and the algorithm determined based on the characteristic recognition of the shot image data 107 by the shot image analysis unit 112.

Here, it should be noted that the image correction process includes a lightness correction process, a contrast correction process, a color (color balance) correction process, a saturation correction process, a smoothing process, a contour emphasis process, a noise reduction process, and the like.

The print data conversion unit 114 converts the shot image data 107 corrected by the image correction processing unit 113, into data (e.g., C (cyan), M (magenta), Y (yellow) and K (black) data) having an appropriate form capable of being printed by the printer 115. Then, the print data conversion unit 114 transfers the converted data to the printer 115 through a predetermined interface.

Therefore, the printer 115 prints and outputs the data transferred from the print data conversion unit 114 of the image processing apparatus 108.

Here, it should be noted that, for example, a serial-scan ink-jet printer, an electrophotographic printer, a sublimation printer or the like is applicable as the printer 115.

Figure 2:
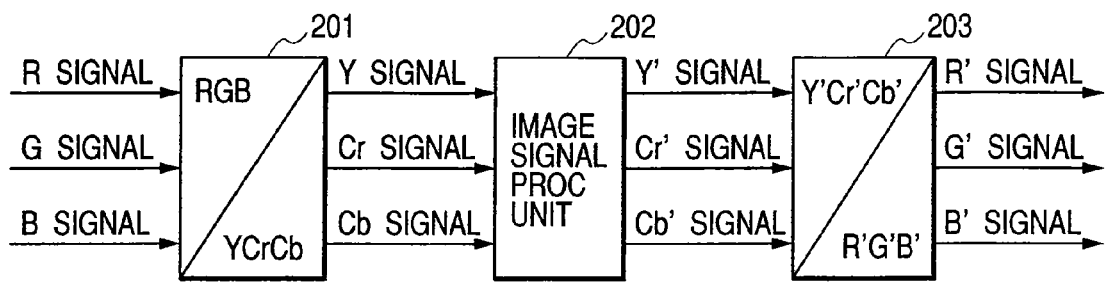
FIG. 2 is a diagram for explaining a case where R (red), G (green) and B (blue) image signals are once converted into Y (brightness), Cr (red color difference) and Cb (blue color difference) signals, the converted Y, Cr and Cb signals are subjected to an image process, and then the processed signals are again converted into R', G' and B' signals.

Incidentally, the data flow in this case will be explained with reference to FIG. 2. As shown in FIG. 2, R, G and B image signals are once converted into Y, Cr and Cb signals by a RGB/YCrCb conversion unit 201, the converted Y, Cr and Cb signals are subjected to the image process by an image signal processing unit 202, and Y', Cr' and Cb' signals obtained by the image process are then converted into R', G' and B' signals by a Y'Cr'Cb'/R'G'B' conversion unit 203.

In the present embodiment, the functions of the structural components 109 to 114 included in the image processing apparatus 108 are achieved by activating the predetermined application program running on the personal computer. However, the present invention is not limited to this. For example, these functions may be achieved by hardware, and more specifically, these functions may be achieved a driver of the printer 115.

Furthermore, for example, in a case where a personal computer is used as the image processing apparatus 108, the image data 105 may be stored in a storage medium such as a hard disk or the like of the image processing apparatus 108 or in a storage medium of another personal computer (including a server or the like) connected to the image processing apparatus 108 so that the stored image data 105 can be processed in the image forming apparatus 108.

Moreover, as described above, the method of using the arbitrary communication line, the recording medium or the storage medium can be applied to transfer the image data 105 from the digital still camera 101 to the image processing apparatus 108 (the storage medium or the like in the personal computer if the personal computer is used as the image processing apparatus 108). In addition, for example, a card reader, cable connection, infrared data communication or wireless communication may be applied to transfer the image data 105. In this case, for example, the digital still camera 101 may be connected to the image processing apparatus 108 through the cable connection, the infrared data communication or the wireless communication so that the image processing apparatus 108 directly reads the image data 105 from the a memory card, an internal memory or the like of the digital still camera 101.

Moreover, in the image print system 100, for example, the function of the image processing apparatus 108 may be provided in the printer 115. In this case, it is unnecessary to use the personal computer or the like as the image processing apparatus 108. Also, in this case, for example, the image data 105 may be read by the data reading means (corresponding to the function of the reader unit 109) such as the card reader or the like provided in the printer 115 through the recording medium or the storage medium such as the memory card or the like. Alternatively, the digital still camera 101 may be connected to the printer 115 through a cable, infrared data communication or wireless communication so that the printer 115 directly reads the image data 105 from the memory card, the internal memory or the like in the digital still camera 101.

Next, the color balance correction and the lightness correction will be explained.
(Color Balance Correction)
(First Processing Method)

First, the contents of the process in the color balance correction will be explained with reference to FIGS. 3 to 10.

Figure 3:
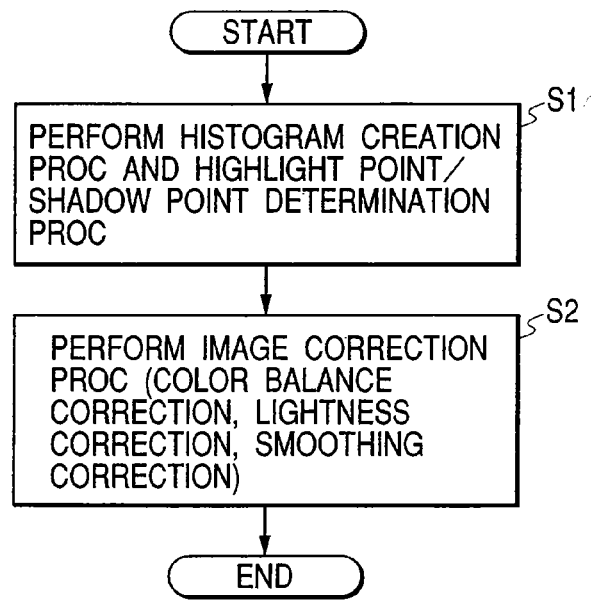
FIG. 3 is a flow chart showing a processing procedure of an image correction processing unit.

As shown in FIG. 3, the image correction processing unit 113 in the present embodiment performs a histogram creation process (step S1), and performs an image correction process according to a created histogram (step S2). That is, in the step S1, the histogram is created in a process as shown in FIG. 4, and then highlight and shadow points of an image are determined on the basis of the created histogram.

(Creation of Brightness Histogram)

FIG. 4 shows the flow chart for creating the brightness histogram according to the present embodiment.

In FIG. 4, the process enters into a routine for creating the brightness histogram of an original image in a step S401, and a selection ratio of pixels to be used for creating the brightness histogram is determined from the pixels of the original image in a step S402. In the present embodiment, it is assumed that, in a case where process-target image data includes 350,000 pixels, the brightness histogram intended for all the pixels is created (i.e., selection ratio is 1 (or 100%)). On one hand, in a case where the image data which includes the pixels of which the number exceeds 350,000 pixels is input, pixel selection (sampling) is performed according to the ratio of the number of the total pixels to 350,000 pixels. For example, if image data of 3,500,000 pixels is input, the selection ratio is 3,500,000/350,000=10, whereby the brightness histogram is created at a rate of one pixel every ten pixels (selection ratio is 10 (or 10%)). In any case, according to the present embodiment, a selection ratio n is obtained by an equation n=int(the number of total pixels in process-target image data/the number of reference pixels (350,000)). Here, it is assumed that n=1 if n<1, and n is a positive integer. Subsequently, a counter for controlling a line number is reset or set to have a predetermined initial value in a step S403, and the counter is then incremented to have the line number of a noticeable line in a step S404.

In the present embodiment, a thinning-out process (sampling) to the pixels is performed in regard to each line. Thus, in the case where the selection ratio is n, if the remainder when the line number is divided by n is 0, the pixel which belongs to the line in question is selected as the processing target (YES in a step S405). For example, in the case where the selection ratio is 10, if the remainder when the line number is divided by 10 is 0, the pixel which belongs to this line is selected as the processing target. On the other hand, if the noticeable line is the line to be thinned out, that is, if the noticeable line is not the process-target line, the flow returns to the step S404. If the noticeable line is the process-target line, the flow advances to a step S406 to sequentially perform a brightness conversion process and a chromaticity conversion process to the noticeable pixels belonging to the noticeable line. Here, it should be noted that, in the present embodiment, the brightness conversion and the chromaticity conversion are performed according to the following equations:

$Y \text{ (brightness)} = \text{int}(0.30R + 0.59G + 0.11B)$ $C1 \text{ (chromaticity)} = R - Y$ $C2 \text{ (chromaticity)} = B - Y$ In the equations, Y is a positive integer. Here, it should be noted that the brightness and chromaticity conversions can be performed according to various equations other than the above equations.

In the present embodiment, in order to improve detection precision of a white position (highlight point) and a black position (shadow position), a saturation S of the noticeable pixel is calculated according to an equation $S = \text{sqrt}(C1^2 + C2^2)$ (where sqrt(x) indicates a function for providing the square root of x, and $x^y$ indicates y-th power of x), so as to judge whether or not the saturation S is higher than a predetermined saturation value (Sconst) in a step S407. If S is higher than Sconst, the information of the pixel in question is not reflected on the brightness histogram.

That is, if S>Sconst, the flow returns to the step S406 not to reflect the data of the noticeable pixel on the following process. This is because, as described later, the saturation of the white position is provided by average saturation of a high-brightness pixel group and the value of this saturation is an error which occurs due to color fog, whereby it is preferable to eliminate the pixel essentially though to have high saturation from the calculation of the highlight point. Incidentally, the effect of the process in the steps S406 and S407 will be concretely explained. For example, in regard to the yellow pixel (R=G=255, B=0), the brightness Y and the saturation S of the yellow pixel are respectively 226 and 227 according to the above equations. That is, it is understood that the yellow pixel has extremely high brightness and includes a sufficiently high-saturation color. In regard to that kind of pixel, it is improper to understand that an achromatic-color pixel fogs or obscures yellow and the yellow pixel is resultingly obtained, that is, it is rather unmistakable if that kind of pixel is understood to be originally a yellow pixel. In any case, if such a high-brightness and high-saturation pixel is included in the histogram, an error occurs in the detected white position. Therefore, according to the present embodiment, the predetermined saturation Sconst is determined, and the pixel which has the saturation exceeding the predetermined saturation Sconst is not included in the histogram. By doing so, it is possible to prevent that, in the detected white position, the error occurs due to the high-saturation pixel, whereby it is possible to improve the detection precision of the white position.

As above, after the judgment in the step S407, the brightness histogram is created for the pixel which satisfies S≦Sconst (step S408). Here, since each of the R, G and B pixel data managed in the present embodiment is eight-bit (256 gradations) data, the brightness Y is converted to have the depth of 256, whereby the brightness histogram is obtained by calculating how many frequencies of the pixels of each of the brightness values of 256 levels from 0 to 255 levels exist.

Furthermore, in the present embodiment, since the calculated values of the chromaticity C1 and the chromaticity C2 are used as the data for calculating, in later color fog correction, the average chromaticity of the pixel having the respective brightness values, these values are held as follows. That is, three members of a frequency, a C1 accumulation value and a C2 accumulation value are set in the form of structure arrangement parameters of which the index range is 0 to 255, and the calculated result of each pixel is reflected on each member having the brightness value of this pixel as an index.

If the process to the noticeable pixel ends, then it is judged whether or not the process to all the pixels in the noticeable line end (step S409). If the pixel not yet processed remains in the noticeable line, the flow returns to the step S406 to repeat the processes in and after the step S406. On the other hand, if the process to all the pixels in the noticeable line ends, it is further judged in a step S410 whether or not the line not yet processed remains. If process to all the lines ends, the process ends in a step S411. On the other hand, if the line not yet processed remains, the flow returns to the step S404 to shift the noticeable line to a next line and repeat the process.

As above, by creating the brightness histogram while selecting the pixel of the original image data, the brightness histogram taking account of the precision in the later white and black position detection can be created with a minimum number of pixels.

(Detection of White Position and Black Position)

After the brightness histogram completed, the white position (highlight point) and the black position (shadow point) are determined. In the present embodiment, the point where the accumulated brightness frequency value toward the center from the brightness value 0 on the brightness histogram is 1750 is set as the black position, and the accumulated brightness frequency value toward the center from the brightness value 255 is 1750 is set at the white position.

That is, if it is assumed that the frequency of the pixel of the brightness value Y is PY, the accumulated frequency is obtained such as P0+P1+ . . . , and the brightness value at a time when the accumulated frequency exceeds 1750 is set as the brightness value YSD of the black position. Then, the average chromaticity of the pixels having the brightness value YSD is obtained. As described above, the accumulated chromaticity of the pixels of the brightness N of which the accumulated value of the chromaticity of each brightness value has been calculated at a time when the brightness histogram was created is set as C1Ntotal and C2Ntotal. Thus, the average chromaticity (C1SD, C2SD) of the pixels of the brightness value YSD being the black position is obtained as follows:

$$C1SD = C1YSDtotal/PYSD$$

$$C2SD = C2YSDtotal/PYSD$$

Then, the white position is similarly determined. That is, the accumulated frequency is obtained such as P255+ P244+ . . . , and the brightness value at a time when the accumulated frequency exceeds 1750 is set as the brightness value YHL of the black position. Then, the average chromaticity (C1HL, C2HL) of the pixels having the brightness value YHL is obtained as follows:

$$C1HL = C1YHLtotal/PYHL$$

$$C2HL = C2YHLtotal/PYHL$$

By the above calculation, the white position (C1HL, C2HL, YHL) and the black position (C1SD, C2SD, YSD) can be obtained in a (C1, C2, Y) color space.

Although the accumulated frequencies are obtained from the brightness positions of the brightness value 0 and the brightness value 255 in the present embodiment, a predetermined offset may be rendered. That is, for example, the accumulated frequencies may be obtained from the brightness positions of the brightness value 1 and the brightness value 254.

As above, the white position (highlight point) and the black position (shadow point) are determined in the step S1 of FIG. 3.

Then, in the step S2 of FIG. 3, the image correction process is performed on the basis of the white position and the black position both determined in the step S1. In the present embodiment, the color fog correction to correct the color fog of the original image, exposure correction to correct the contrast of the brightness for optimizing the exposure of the original image, and saturation correction to improve the sight of the color on an output image are performed as the image correction process.

Figure 9:
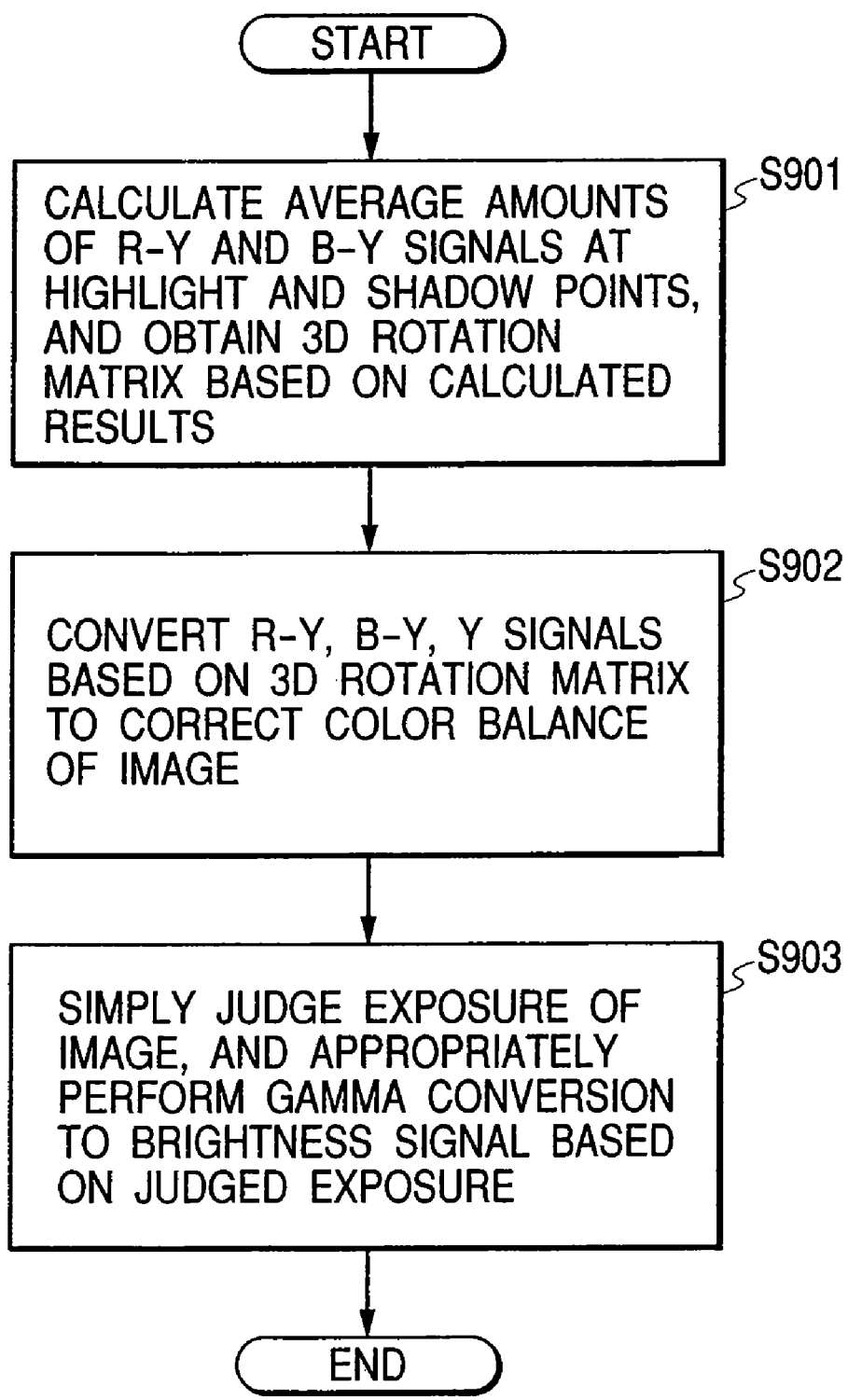
FIG. 9 is a flow chart showing a control procedure of image correction.

FIG. 9 shows the flow of the correction process which is performed by the image correction processing unit 113 in the step S2 of FIG. 3. That is, a rotation matrix for the color fog correction is first obtained (step S901), the color balance (color fog) is corrected by using the obtained rotation matrix (step S902), and gamma conversion is then performed to the brightness signal in accordance with an exposure state of the image (step S903). Hereinafter, the correction process will be explained sequentially.

(Color Fog Correction)

If the white position and the black position in the (C1, C2, Y) color space of the original image are obtained, then the color fog is corrected.

Figure 5B:
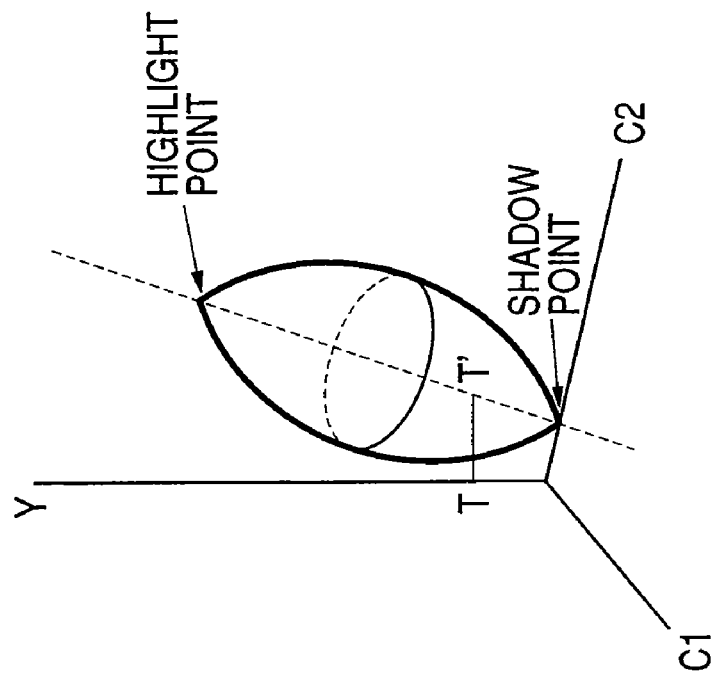
FIGS. 5A and 5B are color solid diagrams for explaining the principle of color balance correction in the embodiment, that is.

If the original image does not include any color fog, that is, the original image is an ideal image, the achromatic color is R=G=B and the calculated value of the chromaticity of the white and black positions is C1HL=C2HL=C1SD=C2SD=0. However, if the original image includes the color fog, the straight line (color solid axis) between the white position (C1HL, C2HL, YHL) and the black position (C1SD, C2SD, YSD) inclines toward the hue direction of the color fog in proportion to the extent of the color fog in question (FIG. 5B). Thus, the color fog correction can be achieved by the conversion to conform the color solid axis and the Y axis (brightness axis) to each other. Here, it should be noted that the conversion can be achieved by the rotation and the parallel movement of the color solid or by converting a coordinate system.

Figure 5A:
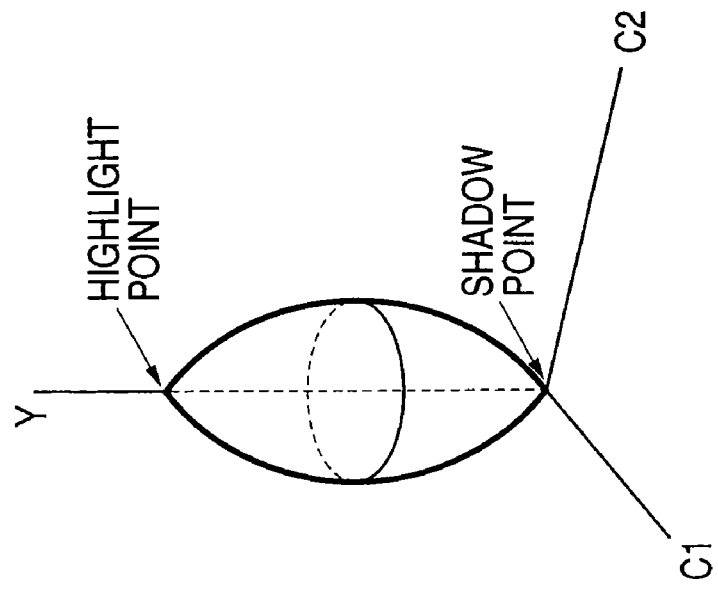

In the present embodiment, in the color solid of the original image, the color solid axis is first rotated based on the lowest brightness point (lower end point) of the color solid axis so that the color solid axis becomes parallel with the Y axis. Then, the coordinate system is converted so that the position of the lowest brightness point becomes the origin of the (C1, C2, Y) color space. By the above process, it is possible to obtain the conversion result that the lowest brightness point is the origin and the color solid axis conforms to the Y axis. Here, FIG. 5A shows the color solid which shows the ideal color distribution of the image data. Thus, it is possible to approximate the color solid after the above conversion to the ideal color solid (FIG. 5A).

Furthermore, when the color solid axis is rotated so as to become parallel with the Y axis, the rotation axis and the rotation angle can be easily determined from the coordinate values of the highlight and shadow points. Incidentally, since a method of determining a rotation matrix to rotate a solid around a desired rotation axis by a desired angle in a three-dimensional space is well known, the detailed explanation thereof will be omitted.

As above, each pixel of the original image is converted into the pixel data (C1, C2, Y) in the three-dimensional color space including the chromaticity axis and the brightness axis, and the obtained data is rotation and parallel-movement converted into pixel data (C1', C2', Y') so that the color solid axis (gray line) connecting the black and white positions with each other conforms to the Y axis and the lowest brightness becomes the coordinate origin, whereby the color fog can be corrected.

(Adjustment of Contrast and Saturation)

Next, a method of simply judging overexposure or underexposure of an image and then performing gamma correction to the brightness signal of the image in question based on the judged result, in order to achieve a further high-quality image based on the adjustment of contrast and saturation, will be explained.

It should be noted that such a process is the part of the color balance correction and thus does not take account of any exposure data included in the shooting condition data 106, whereby this process is different from later-described lightness correction which takes account of the value of the exposure data.

The contrast is adjusted by adjusting the brightness of the black position (shadow point) to 0 or a value close to 0 (e.g., 10) and also adjusting the brightness of the white position (highlight point) to 255 or a value close to 255 (e.g., 245).

Next, the case of simply judging the overexposure or the underexposure of the image and then performing the gamma correction to the image data based on the judged result will be explained.

First, the points that the distance between the color solid axis to be corrected and the brightness (Y) axis becomes minimum, i.e., points T and T' in FIG. 5B, are obtained. These points can be easily obtained from geometrical relation.

Then, the contrast is adjusted so that the brightness component YT' after the color fog correction becomes the brightness component YT at the point T. That is, as shown in FIG. 6, in a case where the point (YT', YT) is set as the turning point, if the brightness Y' after the color fog correction is lower than the brightness component YT', the brightness is corrected to have the value Y" by the function given as a straight line a, while if the brightness Y' is higher than the brightness component YT', the brightness is corrected to have the value Y" by the function given as a straight line b.

Figure 6:
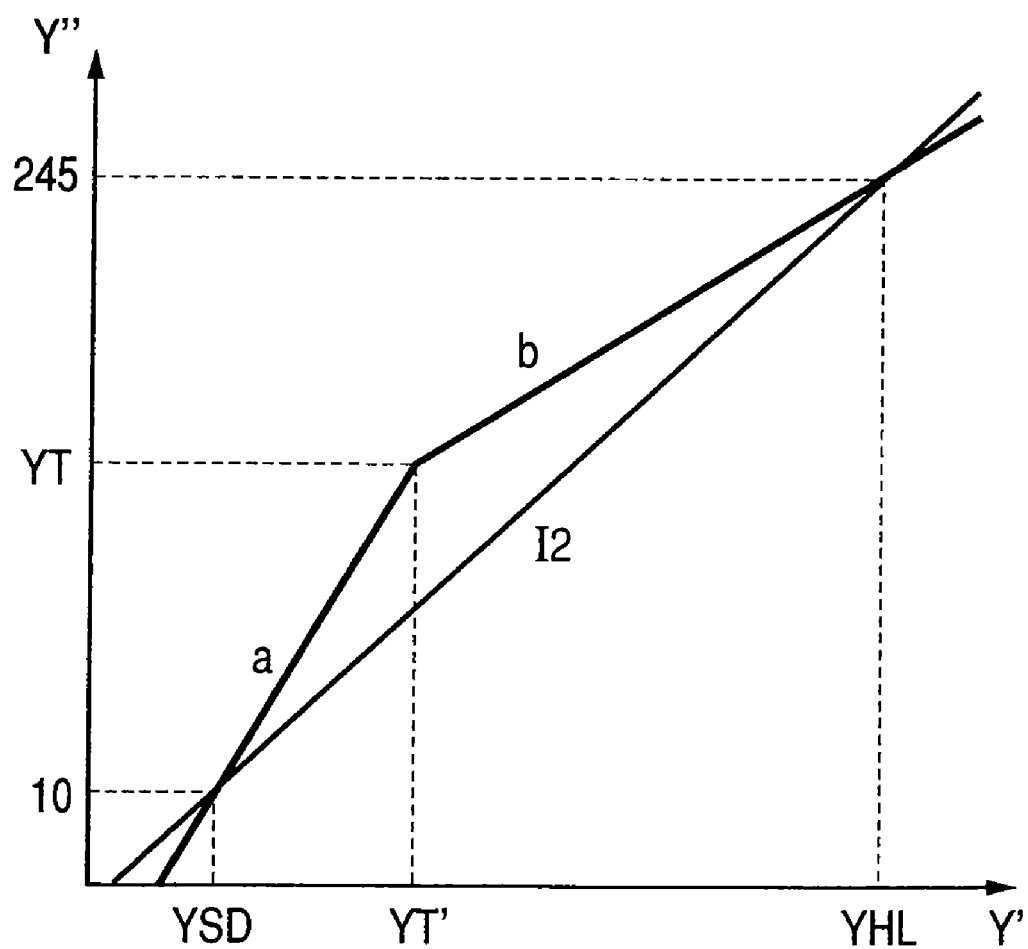
FIG. 6 is a graph showing a non-linear gamma conversion function.

It should be noted that, of course, the correction by the function given as a straight line l2 of FIG. 6 may be performed without using the points T and T'. When the color solid axis is parallel with the brightness axis, the relation between the points T and T' is not 1:1. Furthermore, when the points T and T' are outside the range (0, 255), the point (YT', YT) cannot be set as the turning point. In these specific cases, the color fog only has to be corrected according to the straight line l2.

Figure 7A:
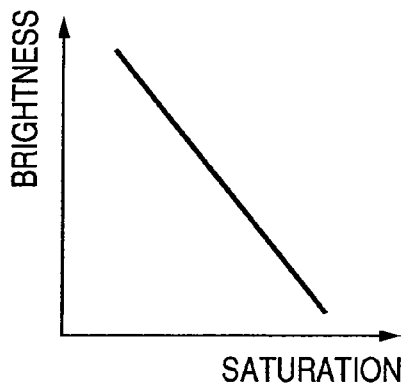
FIGS. 7A, 7B, 7C and 7D are diagrams showing the features of overexposure and underexposure on a brightness-saturation plane, that is.
Figure 7B:
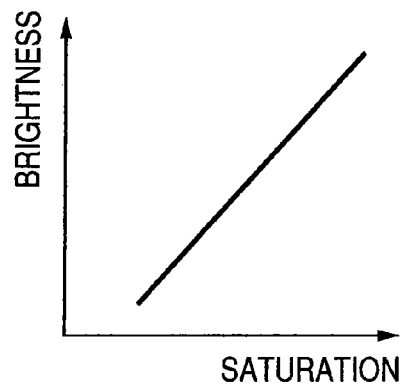

The correction using the most closest points T and T' on the straight line particularly acts on an overexposure or underexposure image. That is, the reason why overexposure appears is that the entire image is pulled toward a light subject such as sky or the like. In this case, high-brightness color is suppressed in an input device as represented by a digital camera, whereby the saturation of the high-brightness portion is lowered. More specifically, if the color solid axis of the image to which the high-brightness color has been suppressed is considered on the two-dimensional plane having the saturation and brightness axes as shown in FIG. 7A, the pixel which is closest to achromatic color appears at the high-brightness portion. On the contrary, since low-brightness color is suppressed for an underexposure image, the saturation is low in the low-brightness portion as shown in FIG. 7B.

Figure 7C:
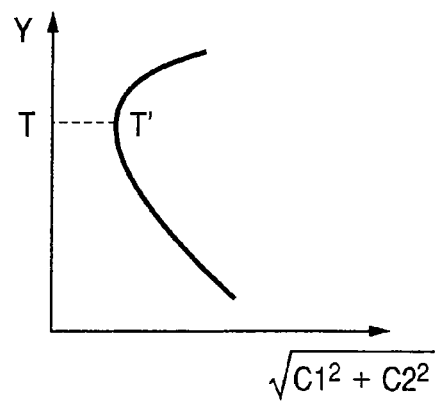
Figure 7D:
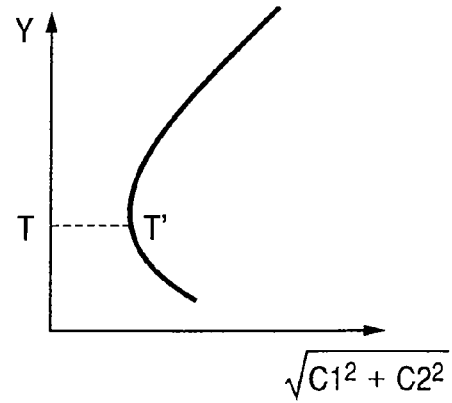

Then, in actual images, if the brightness axis of the color solid is considered on the brightness-saturation plane, the overexposure image is represented as shown in, e.g., FIG. 7C, while the underexposure image is represented as shown in, e.g., FIG. 7D. If it is assumed that the actual color solid is shifted or deviated from the inherent (ideal) color solid due to a shooting condition of some kind and/or an influence of data input (at a time of A/D conversion), it is considered that the position connecting the points T and T' with each other is the minimum-shift (or minimum-deviation) position. Therefore, in the present embodiment, by restituting the shift at this position, it is possible to easily perform appropriate gray (entire lightness) correction.

Of course, it is possible to merely use the point T as a means for simply judging the overexposure and underexposure of the image to previously prepare LUT's (look-up tables) for the overexposure and the underexposure, and thus perform the gamma adjustment (correction) of the brightness signal according to the brightness components of the points T and T'. For example, the contrast may be adjusted according to the curve having the point (YT', YT) as the turning point shown in FIG. 6. Therefore, it is possible to easily judge whether the target image is overexposed or underexposed on the basis of the values of the points T and T'. In other words, if the brightness component of the point T' of which the saturation is lowest on the color solid axis is at the higher-brightness side, the relation of brightness-saturation of this image shows a tendency as shown in FIG. 7A, while if the brightness component of the point T' is at the lower-brightness side, the relation of brightness-saturation of this image shows a tendency as shown in FIG. 7B. Therefore, in the image of which the high-brightness color and the low-brightness color are suppressed, if the brightness component of the point T' is at the higher-brightness side, it is thought that this image tends to be overexposed, while if the brightness component of the point T' is at the lower-brightness side, it is thought this image tends to be underexposed.

On one hand, it is possibly to easily adjust and correct the saturation by multiplying the chromaticity C1 and the chromaticity C2 by a saturation correction coefficient. For example, in case of increasing the saturation by 20%, since the saturation after correction becomes 120% of the saturation before correction, the saturation is corrected by using the saturation correction coefficient 1.2. That is, in practice, the saturation correction can be performed according to the following equations:

$$C1''=1.2 \times C1'$$

$$C2''=1.2 \times C2'$$

Here, it should be noted that this is because the saturation is defined by $S=\sqrt{C1^2+C2^2}$.

(Inverse Conversion into RGB Color Space)

The various correction processes in the present embodiment end as above. At this moment, since each pixel of the original image is in the state that the color signal data of (R, G, B) has been converted into the color space data of (C1", C2", Y"), the color space data of (C1", C2", Y") is again inverse-converted into the color signal data of (R', G', B'). Here, the inverse conversion is performed according to the following equations:

$$R'=Y''+C1''$$

$$G'=Y''-(0.3/0.59)*C1''-(0.11/0.59)*C2''$$

$$B'=Y''+C2''$$

As above, the R, G and B data of which the color fog, the contrast and the saturation have been corrected can be obtained in regard to the original image.

As can be seen, according to the present embodiment, the color fog correction can be surely performed with a less processing load.

Furthermore, according to the present embodiment, since a sampling condition is set according to the image data size of the original image, the relation between the total frequency of the histogram and the accumulated frequency for determining the white and black positions can be made substantially constant, whereby the excellent color fog correction can be achieved.

Moreover, according to the present embodiment, the entire image is linearly gamma-corrected so as to maintain the brightness at the point where the distance between the color solid axis of the correction-target image and the brightness axis is shortest, whereby it is possible to correct the contrast as maintaining the brightness which is considered to be closest to the value of the original image.

Moreover, it is possible to easily judge the exposure state of the image, i.e., whether the image is overexposed or underexposed, and it is also possible to perform the gamma correction by appropriately selecting the table which is different in regard to the judged exposure state. However, such a means for judging the exposure is simply performed by analyzing the image data with use of the histogram, but is different from a method of judging the exposure state on the basis of the shooting condition data 106.

Here, it should be noted that the sampling may be performed in units of column instead of line.

(Second Processing Method)

Next, the second processing method which takes account of the level of correction as compared with the above first processing method will be explained according to the second embodiment.

As explained in the first embodiment, in the case where the color solid axis of the image is obtained, if the inclination of this axis is overly large, there is the fear that a problem occurs in the image if the correction is performed in disregard of this inclination. For example, when a user intentionally gives the color fog by using a color filter or the like, or when the user shoots an evening glow scene, such a problem occurs.

In this case, it is possible to eliminate this problem by not performing the correction under the judgment that the obtained highlight and shadow points are erroneous or by appropriately adjusting a rotation angle to decrease the level of correction. In this connection, the judgment that the obtained highlight and shadow points are erroneous can be achieved on the basis of the direction of the color solid axis. Since it is possible from the inclination of the color solid axis to easily judge which color is fogged, it is also possible not to correct the color fog in regard to the image shot by, e.g., the color filter so as to aim at a specific effect.

In such a case, by paying attention to the angle between the direction vector of the color solid axis of the original image and the brightness axis, it is judged that the problem occur contrarily if the color correction is performed, thereby refraining from performing the process or decreasing the level of process. For example, the color solid axis is inclined toward the hue direction at an angle equal to or larger than a predetermined angle, e.g., 40°, it is judged that the image in question is the inherently color-fogged image such as an evening glow image. In case of decreasing the level of process, the color solid axis is raised by a predetermined angle, e.g., 20° or raised until the inclination of the color solid axis to the Y axis becomes a predetermined angle, e.g., 20°, thereby correcting the color fog. Here, it should be noted that the rotation matrix for such a conversion can be easily obtained from the rotation axis and the rotation angle.

Furthermore, the level of process (i.e., correction) may be manually designated by a user or may be previously set according to the level of angle and the color solid axis direction. For example, although the color solid axis is raised by 20° if the color solid axis is inclined toward the hue direction at 40° in the above example, the level of angle to be raised may be set by the user. The following process is the same as that in the first embodiment.

Moreover, since it is possible from the inclination of the color solid axis to easily judge which color is fogged, it is also possible not to correct the color direction of the filter in regard to the image shot by, e.g., the color filter so as to aim at the specific effect. That is, in such a case, the color of which the color fog is not to be corrected is first designated, the rotation axis of the rotation conversion is set along the direction of the color not to be corrected on the C1-C2 plane, and the color solid is rotation-converted until the plane including the rotation axis and the color solid axis becomes parallel with the Y axis. By doing so, the color fog can be corrected only for a specific color component.

Figure 10:
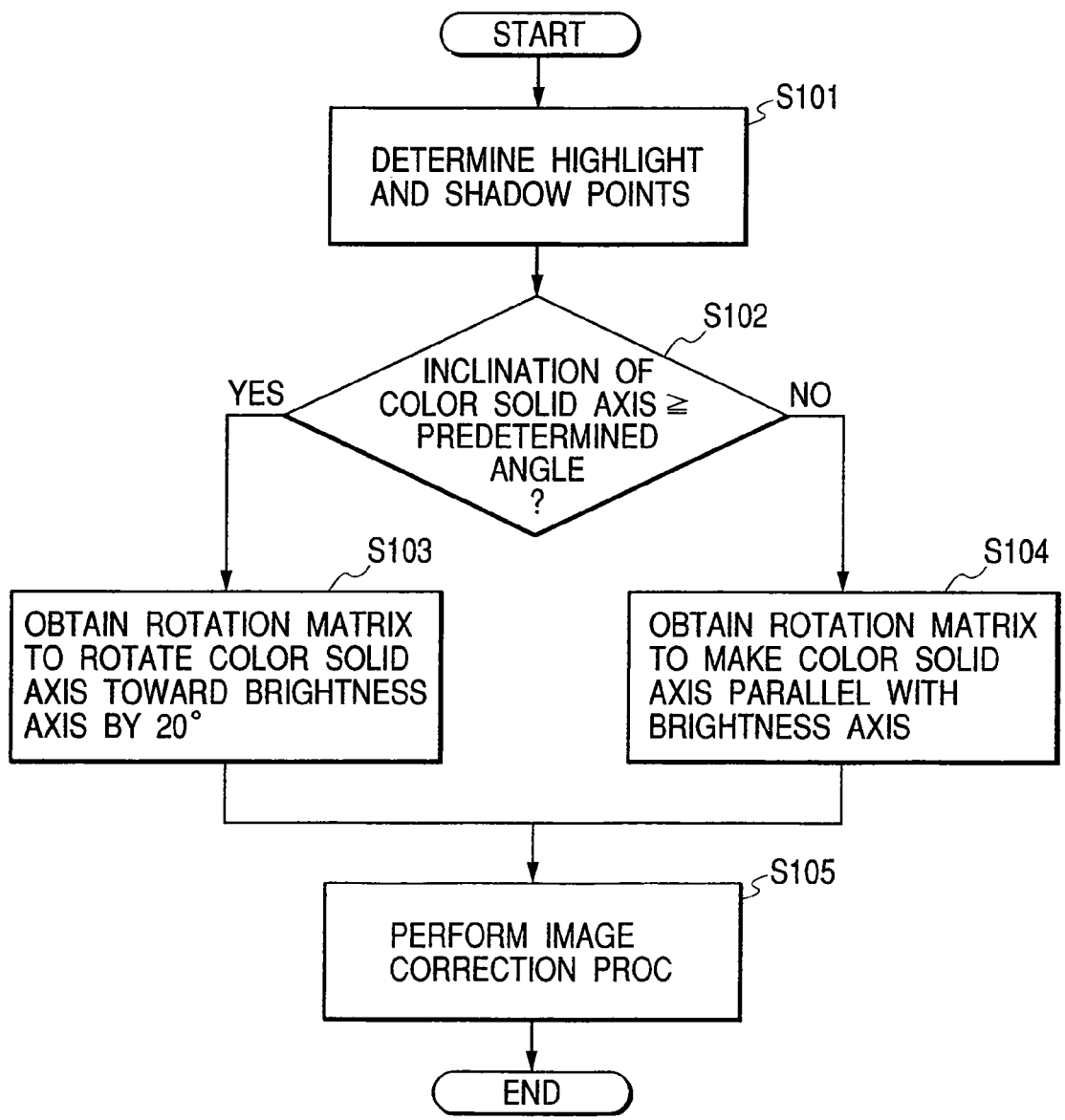
FIG. 10 is a flow chart showing a control procedure of color fog correction in the second embodiment.

FIG. 10 is the flow chart showing the control procedure to correct the image so that, in the case where the color solid axis is inclined equal to or larger than the predetermined angle, the color solid is rotated up to a separately designated angle. First, in a step S101, the highlight and shadow points are determined, and then it is judged in a step S102 whether or not the inclination of the color solid axis is equal to or larger than the predetermined angle. If the inclination is smaller than the predetermined angle, then in steps S104 and S105 the conversion is performed so that the color solid axis coincides with the brightness axis in the same manner as that in the first processing method, thereby correcting the color fog.

On the other hand, if the inclination of the color solid axis is equal to or larger than the predetermined angle, the rotation matrix to rotate the color solid axis toward the brightness axis by 20° is obtained in a step S103, and then the color solid is rotated by using the obtained rotation matrix in the step S105, thereby correcting the color fog. In this case, it should be noted that the angle 20° used in the step S103 may be designated by the user through a user interface (UI) of an application program or may be given as a default value by an application program.

Furthermore, two kinds of thresholds may be provided. In such a case, if the inclination of the color solid axis is larger than a first threshold (e.g., 40°), it is possible to perform the rotation conversion to raise the color solid axis by, e.g., 20° to the extent that the color solid axis does not become a complete gray line. Moreover, if the inclination of the color solid axis is between the first threshold and a second threshold (e.g., 20°), it is possible not to perform the rotation conversion, if the inclination of the color solid axis is smaller than the second threshold, it is possible to perform the rotation conversion to coincide the color solid axis and the brightness axis with each other. In this case, it should be noted that the thresholds may be initially set by the user through a UI or may be given as default values by an application program. By doing so, improper correction is not performed to the image to which the color fog has been intentionally given.

As above, according to the second processing method (second embodiment), at least the two or more thresholds necessary to determine the correction are provided on the basis of the inclination of the color solid axis consisting of the pixels of the image data, i.e., two amounts of the direction and the inclination angle of the axis, and then it is judged based on these threshold values whether or not the image should be corrected and whether or not the level of correction should be adjusted. Therefore, it is possible to very easily eliminate only the adverse effect in a special case.

Furthermore, since it is possible based on the direction of the color solid axis to judge which color is fogged, it is possible not to correct the color fog according to the color direction of the color fog.

(Third Processing Method)

In the first and second processing methods, the color balance correction based on the highlight and shadow points of the image is performed. On one hand, a method (third embodiment) of performing the correction based on other reference points will be explained hereinafter.

First, an average color difference amount $\Delta E$ is obtained as follows:

$$\Delta E = \mathrm{sqrt}((C1HL - C1SD)^2 + (C2HL - C2SD)^2)$$

Figure 8:
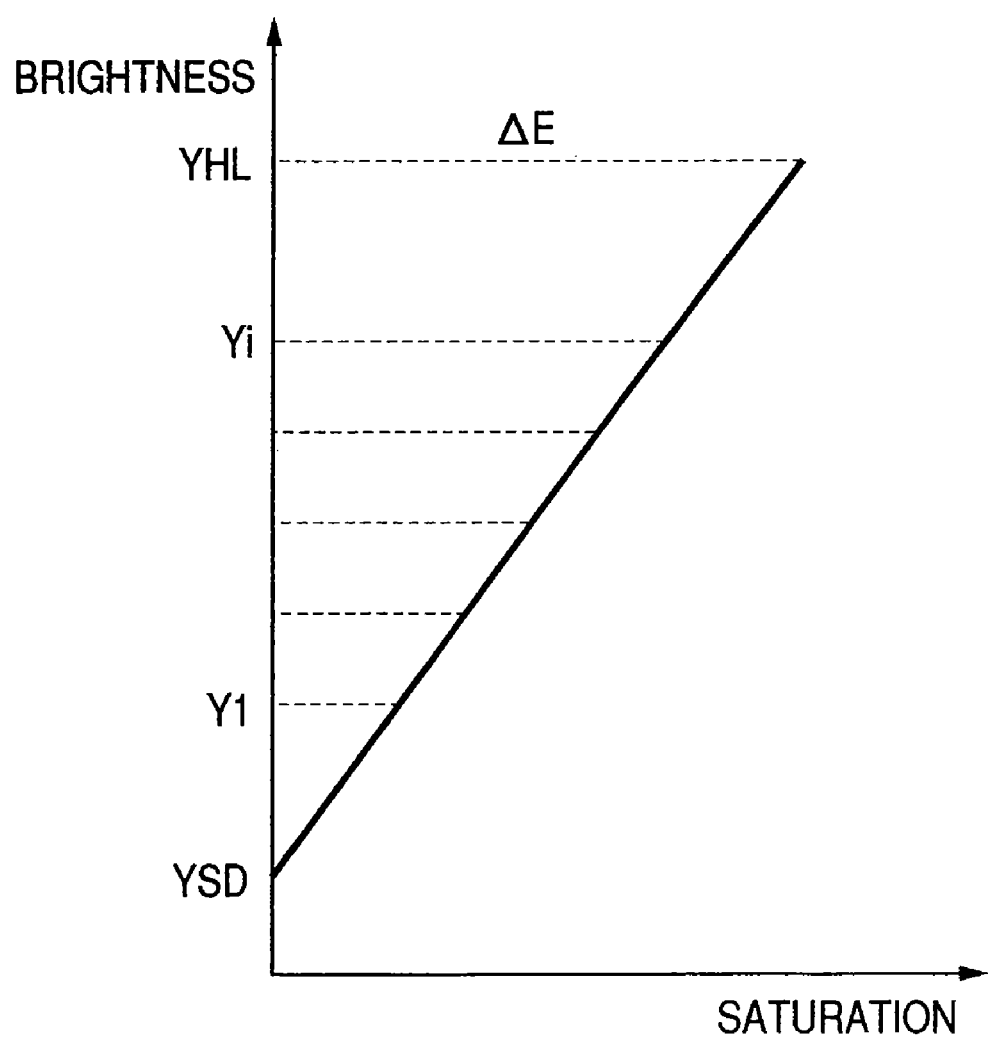
FIG. 8 is a diagram showing a condition that a color solid axis in the third embodiment is determined.

If the color solid axis is parallel with the brightness axis, it is sure to become $\Delta E = 0$. On the other hand, if the color solid axis is inclined, $\Delta E$ becomes the value larger than 0. That is, if the average color difference amount $\Delta E$ is considered on the E(saturation)-Y(brightness) plane, the value $\Delta E$ is given as shown in FIG. 8.

Next, several kinds of sample brightness between the highlight and shadow points are prepared. The average color difference amount is obtained from the pixels of, e.g., predetermined brightness Yn in the several kinds of sample brightness in the image by using the pixel of the saturation smaller than a value ΔEn. Here, it should be noted preset certain saturation may be used as the value ΔEn, and alternatively, the average color difference amount which is limited in the inclination direction of the color solid axis may be obtained.

A straight line is obtained in regard to the plural kinds of sample brightness according to a method of least squares based on the average color difference, and the process according to the first processing method is performed by using the obtained straight line as the color solid axis of the original image.

Alternatively, an approximated curve of the points consisting of the obtained color difference and the obtained brightness may be obtained by using a B-spline curve or the like, so as to perform the non-linear color balance correction so that the obtained approximated curve is set as the brightness axis, that is, the color difference becomes 0.

As above, the present invention is explained with reference to the preferred embodiments. However, the present invention is not limited to these embodiments, but can be modified variously within the scope of the appended claims.

Thus, the line to be set as the brightness axis can be obtained from not only the highlight and shadow points but also the pixels uniformly sampled form the entire image. Then, the image data is converted so that the obtained line coincides with the brightness axis, whereby it is possible to perform the color fog correction in which the characteristic of the entire image is reflected.

Incidentally, in a case where a white balance is automatically adjusted, the correction amount of the color balance may be variable according to the shift amount from the reference value. For example, if the information representing that the white balance is seriously shifted toward the blue direction from the reference value is obtained in addition to the information representing that the white balance is automatically adjusted, the threshold may be set so that the color balance correction easily trends toward the yellow direction opposite to the blue direction in the color difference signal, whereby the correction process with higher precision can be performed.

(Density Correction)

Next, the density correction to be performed by the image correction processing unit 113 will be explained. In the density correction, the information concerning exposure or the information concerning on/off of stroboscopic light emission is read from the shooting condition data 106, and the optimum lightness correction (i.e., print density correction) is performed based on the read information.

(Judgment of Gradation Curve)

Figure 11:
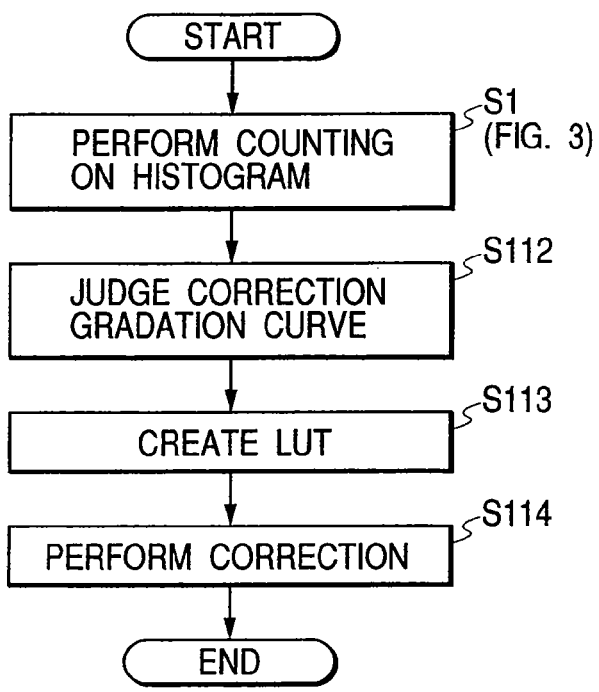
FIG. 11 is a flow chart showing a procedure of an automatic gradation correction process.

In a step S112 of FIG. 11, a correction condition setting process (correction gradation curve judgment process) is performed on the basis of the histogram obtained in the step S1 of FIG. 3. That is, from previously prepared plural gradation curves for brightness correction, the appropriate gradation curve is selected on the basis of an image analysis result.

When the gradation curve is judged in the embodiment, the lightness of the image is judged on the basis of the three parameters (i.e., highlight point, shadow point, and the number of pixels of certain brightness area), and the gradation curve is selected on the basis of the judged result.

Figure 12:
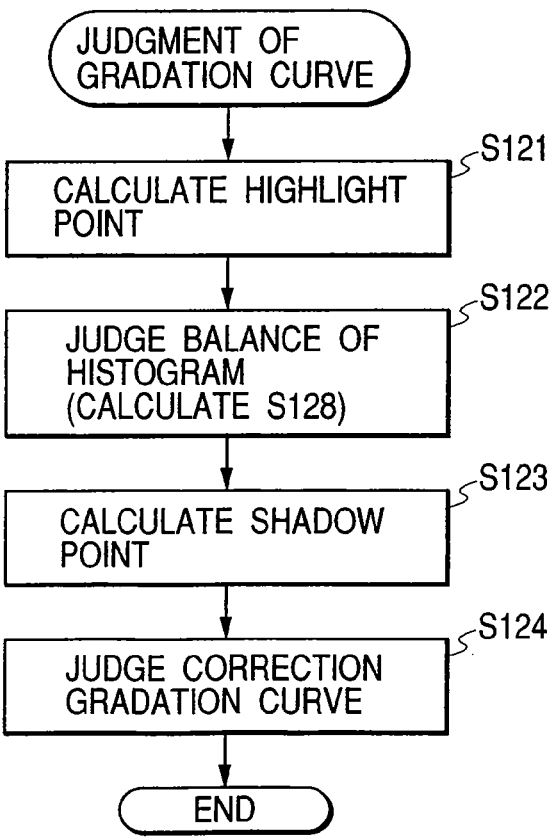
FIG. 12 is a flow chart showing a procedure of a gradation curve judgment process in the automatic gradation correction process shown in FIG. 11.

FIG. 12 is a flow chart showing the details of the gradation curve judgment process. Then, the gradation curve judgment process according to the embodiment will be explained with reference to FIG. 12.

(1) Highlight Point Judgment

In a highlight point judgment process in a step S121 of FIG. 12, the highlight point in the processing-target image is calculated according to the histogram.

In the embodiment, the frequencies of the respective brightness values are sequentially accumulated from the maximum brightness value (255) of the brightness range toward the lower-brightness side on the histogram of the brightness signal Y. Then, for example, the brightness value at which the obtained accumulated frequency coincides with 1.0% of the number of the total pixels of the processing-target image data or the brightness value at which the obtained accumulated frequency first exceeds 1.0% of the number of the total pixels is obtained, and the obtained brightness value is set as the highlight point (HLP).

Then, the highlight point HLP is compared with plural predetermined thresholds Th_H1, Th_H2, . . . (Th_H1<Th_H2<. . . ), whereby the distribution of the histogram in the high-brightness area is analyzed.

For example, in the embodiment, as shown in FIG. 13, a case where the two thresholds to which the values of 200 and 230 are respectively set in due order from the bottom are used will be explained.

Then, if HLP<Th_H1, the image is judged as a dark image of which the high-brightness area is small. If Th_H1≦HLP<Th_H2, the image is judged as an image which is dark as a whole although it includes the distribution of the high-brightness area. If Th_H2≦HLP, the image is judged as a light image which includes many distributions in the high-brightness area.

Figure 14:
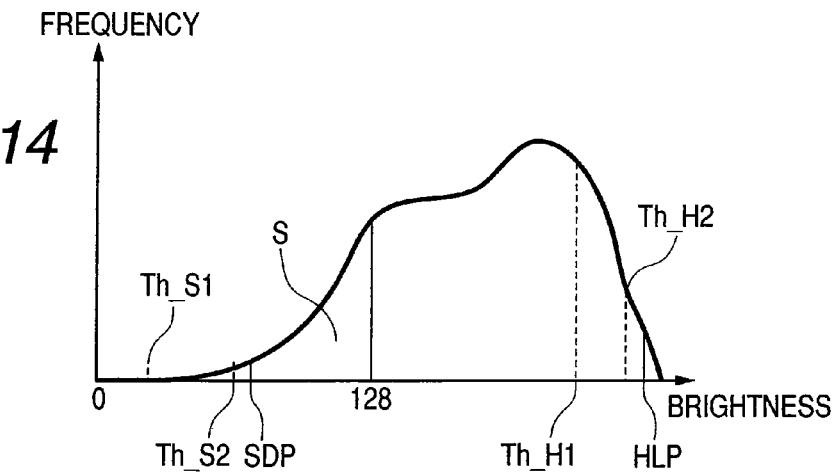
FIG. 14 is a diagram showing a histogram in a case where an image to be processed in the automatic gradation correction process is a light image.

For example, on the histogram of a lightish image as shown in FIG. 14, HLP exceeds the threshold Th_H2 (HLP>Th_H2), whereby the image is judged as an image which includes many distributions in the high-brightness area. On the histogram shown in FIG. 14, the distributions are entirely biased toward the higher-brightness side, whereby the highlight point HLP is resultingly located at the higher-brightness side. Generally, the image showing the distributions of this type is often a light image.

Figure 15:
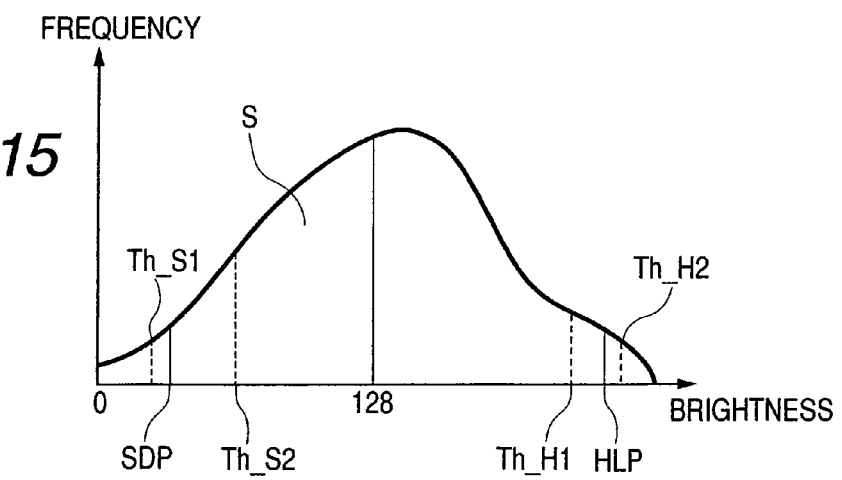
FIG. 15 is a diagram showing a histogram in a case where an image to be processed in the automatic gradation correction process is a moderate light image.

On the histogram shown in FIG. 15, HLP is lower than the threshold Th_H2 and higher than the threshold Th_H1 (Th_H1<HLP≦Th_H2), whereby the image is judged as an image which is not so light although it includes the certain measure of distributions in the high-brightness area. This is because, on the histogram shown in FIG. 15, the brightness roughly shows the intermediate distributions, and the highlight point HLP is located relatively at the lower-brightness side.

Figure 16:
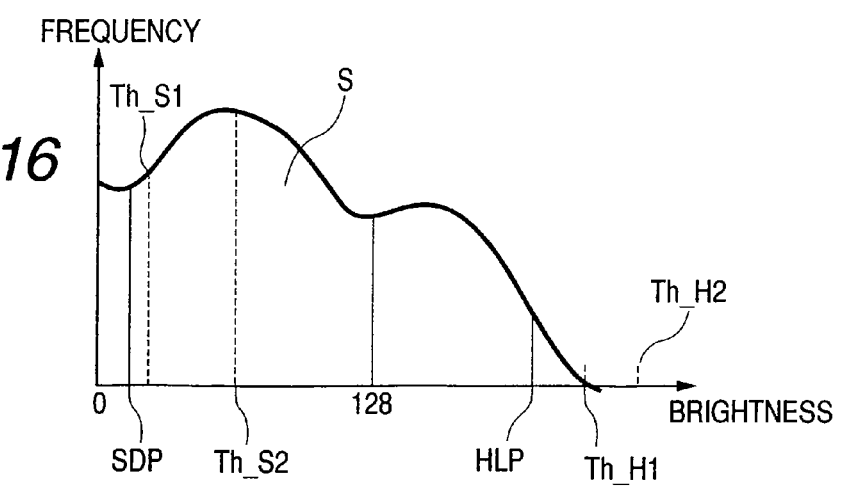
FIG. 16 is a diagram showing a histogram in a case where an image to be processed in the automatic gradation correction process is a dark image.

On the histogram shown in FIG. 16, HLP is lower than the threshold Th_H1, whereby the image is judged as an image which does not include the distribution in the high-brightness area. In this case, the histogram is biased toward the lower-brightness side, whereby it is considered that the image in question is dark as a whole. Furthermore, the fact that HLP is low means that also the gradation level is low. In regard to the image of this type, it is necessary to perform the gamma correction or expand the brightness value toward the higher-brightness side to lighten it.

Here, it should be noted that the calculation of the highlight point HLP need not necessarily depend on the above method, that is, various methods conventionally known may be used appropriately.

Furthermore, if the automatic gradation correction process in the embodiment is combined with other image correction process such as the color fog correction process, the contrast correction process, the saturation correction process or the like, the HLP previously used in the image correction process can be used. In this case, the lightness (darkness) of the image can be judged by using, instead of the highlight point, the shadow point similarly used in the color fog correction process or the like, and it will be apparent from the following explanation that the following process can be performed based on the judged lightness (darkness).

(2) Histogram Balance Judgment

In a step S122 of FIG. 12, the histogram balance judgment is performed by using the histogram obtained in the step S1 (FIG. 3) shown in FIG. 11.

In the histogram balance judgment process, a rate Slow of the accumulated frequency of the predetermined area to the number of the total pixels in the processing-target image is obtained. That is, for example, the rate of the number of the accumulated pixels from the brightness values 0 to 128 (i.e., half of the histogram) to the number of the total pixels in the image of 256 gradations is first obtained, and the entire balance of the histogram of this image is analyzed.

First, an accumulated frequency S of the certain brightness area (0 to 128) is obtained. Here, it should be noted that the accumulated frequency S is obtained as the accumulated frequency obtained from the least brightness value (value 0) up to a predetermined brightness value toward the higher-brightness side within the brightness range on the histogram. In the embodiment, the accumulated frequency up to the brightness value (value 128) being ½ of the maximum brightness value (value 255) is used as the accumulated frequency S in the low-brightness area, but, of course, other value may be used.

Next, the rate Slow of the accumulated frequency S to the number of the total pixels is calculated by using the following equation:

$$Slow = (\text{accumulated frequency S of certain brightness area})/(\text{the number of total pixels})(\%)$$

Here, if the thinned-out histogram is created by thinning out the pixels in the histogram calculation, it should be noted that the denominator of the above equation is defined by the number of the pixels being the target of the histogram creation.

Next, the threshold is again judged by using the obtained accumulated frequency Slow. That is, the rate of the lower half of the histogram to the entire histogram is calculated, whereby the entire brightness balance of the image is analyzed. In the above highlight point judgment, the image is classified into the several kinds according to the distribution state of the high-brightness area on the histogram. However, as shown in FIG. 13, the thresholds are provided corresponding to the respective cases, and the balance of the histogram is judged.

For example, in regard to the lightish image as shown in FIG. 14, the rate to the number of the total pixels up to the brightness value 128 is set as the accumulated frequency Slow. In this case, since Slow is 20% of the number of the total pixels, the image in question is judged as the light image and Slow is judged to be within the range of 16 to 50 in the HLP judgment.

On the other hand, in regard to the darkish image as shown in FIG. 16, Slow is 60% of the number of the total pixels in the area up to the brightness value 128, whereby the image in question is judged as the dark image and Slow is judged to be within the range of 50 to 80 in the HLP judgment.

In a method of judging the balance of the histogram by using the intermediate value and the average value of the histogram, without using the rate of the accumulated frequency in the certain brightness area, the lightness of the image in which the actual distribution state of the histogram is not appropriately reflected is judged. For example, it is assumed that there is an image in which the intermediate value and the average value themselves show the relatively high brightness values, but in practice the brightness values around the intermediate value and the average value have the peak of the frequency distribution and the frequency distribution itself of the low brightness area is small. In the image of this type, there is the fear that this image is erroneously judged as a lightish image, the brightness correction to increase the density is thus selected, and the dark portion occupying the relatively large part of this image is resultingly defaced.

On the other hand, according to the embodiment, the accumulated frequency in the area of the brightness values 0 to 128 being the lower half of the histogram is obtained, and the rate Slow of the obtained accumulated frequency to the number of the total pixels is used, whereby it is possible to judge the lightness distribution of the image in which the actual balance of the histogram is sufficiently reflected. Thus, it is possible to perform the appropriate gradation correction even to such a darkish image as above.

Incidentally, in regard to the range of the rate Slow, the range of the brightness values 0 to 128 is uniformly classified in the embodiment. However, in case of obtaining the information of the low-brightness area in more detail, the low-brightness area in question may be divided into several small areas to perform the process for each small area. Furthermore, the rate Slow of the range of the brightness values 0 to 64 may be weighted by doubling and adding, and the rate Slow of the range of the brightness values 65 to 128 may be weighted by one-multiplying and adding.

By doing so, it is possible to further precisely judge the balance of the histogram.

(3) Shadow Point Judgment

In a shadow point judgment process in a step S123 of FIG. 12, the shadow point in the processing-target image is calculated according to the histogram.

In the embodiment, the frequencies of the respective brightness values are sequentially accumulated from the minimum brightness value (0) of the brightness range toward the higher-brightness side on the histogram. Then, for example, the brightness value at which the obtained accumulated frequency coincides with 1.0% of the number of the total pixels of the processing-target image data or the brightness value at which the obtained accumulated frequency first exceeds 1.0% of the number of the total pixels is obtained, and the obtained brightness value is set as the shadow point (SDP).

Then, the shadow point SDP is compared with plural predetermined thresholds Th_S1, Th_S2, . . . (Th_S1<Th_S2< . . . ), whereby the distribution of the histogram in the low-brightness area is analyzed.

Incidentally, since the shadow point judgment used in the embodiment is performed after the highlight point judgment and the histogram balance judgment, as shown in FIG. 13, a different value is set as the threshold of the shadow point in accordance with the results of the highlight point judgment and the histogram balance judgment.

Then, if SDP≧Th_S2, the image is judged as a light image of which the low-brightness area is small. If Th_S1≦SDP<Th_S2, the image is judged as an image which is light as a whole although it includes the distribution of the low-brightness area. If SDP<Th_S1, the image is judged as a dark image which includes many distributions in the low-brightness area.

For example, on the histogram of the lightish image as shown in FIG. 14, SDP exceeds the threshold Th_S2 (SDP>Th_S2), whereby the image is judged as an image which does not include any distribution in the low-brightness area. In this case, as described above, on the histogram shown in FIG. 14, the distributions are entirely biased toward the higher-brightness side, whereby the shadow point SDP is resultingly located at the higher-brightness side. Furthermore, the fact that SDP is high means that the gradation level is narrow. In regard to the image of this type, it is necessary to perform the gamma correction or expand the brightness value toward the lower-brightness side to darken it.

On the histogram shown in FIG. 15, SDP is lower than the threshold Th_S2 and higher than the threshold Th_S1 (Th_S1<SDP≦Th_S2), whereby the image is judged as an image which is not so dark although it includes the certain measure of distributions in the low-brightness area. This is because the brightness roughly shows the intermediate distributions, and the shadow point SDP is located relatively at the lower-brightness side.

Next, on the histogram shown in FIG. 16, SDP is lower than the threshold Th_S1, whereby the image is judged as an image which includes many distributions in the low-brightness area. In this case, it is understood that the histogram is biased toward the lower-brightness side and thus the image is wholly a dark image.

(4) Determination of Correction Gradation Curve

As shown in FIG. 13, the processing-target image is divided into plural images according to the above three parameters of the detail of the distribution of the high-brightness area on the histogram (highlight point), the rate Slow (balance of histogram), and the detail of the distribution of the low-brightness area on the histogram (shadow point). Then, in a next step S124, the correction gradation curve is determined by using the table shown in FIG. 13.

As apparent from the correction table shown in FIG. 13, by the gradation curve according to the embodiment, the kind of image in question is judged in a comprehensive manner according to the three parameters. For example, if the highlight point is relatively low, the gradation curve to cut off the high-brightness area and thus expand the histogram toward the higher-brightness side is selected. Furthermore, in regard to the image for which the balance of the histogram is intended to be adjusted, the gradation curve to perform the gamma correction is selected. If the rate Slow (balance of histogram) is biased toward the lower-brightness side, the gradation curve including the process to lighten the entire image by correcting the gamma value or the like is selected. Furthermore, if the shadow point is relatively high, the gradation curve including the process to cut off the low-brightness area and thus expand the histogram toward the lower-brightness side is selected. In any case, the gradation curves concerning the classified plural images are determined by using the judgment table shown in FIG. 13.

For example, it is assumed that the highlight point HLP is high (i.e., 245), the rate Slow is 20%, and the shadow point SDP is relatively high (i.e., 60). In regard to such an image, the gradation curve to cut off the low-brightness area of 20 or less is selected.

In regard to the lightish image shown in FIG. 14, HLP is higher than the threshold Th_H2, Slow is 20%, and SDP is higher than the threshold Th_S2. Thus, according to the table shown in FIG. 13, this image is judged as a light image, and the gamma value is set to 1.1. By the determined gamma value, the correction to darken the image up to the relatively high-brightness area (i.e., to increase the print density) is performed, whereby the print image having the optimum density as a whole is obtained. Furthermore, since the rate of the pixels in the low-brightness area is low, it is possible to decrease the portion where the image is defaced.

Next, in regard to the image for which the balance of the histogram is intermediate as shown in FIG. 15, HLP is higher than Th_H1 and smaller than Th_H2, Slow is 40%, and SDP is higher than Th_S1 and smaller than Th_S2. Thus, according to the table shown in FIG. 13, the contrast of this image can be emphasized by using the correction gradation curve of S-curve, whereby it is possible to enhance the contrast of the entire image to be printed and thus obtain a sightly print image.

On one hand, in regard to the dark image as shown in FIG. 16, HLP is smaller than Th_H1, Slow is 60%, and SDP is smaller than Th_S1. Thus, according to the table shown in FIG. 13, the straight line to cut off the high-brightness area of 200 or more is selected, whereby it is possible to lighten the entire image to be printed. In particular, it is possible to expand the histogram of the image toward the higher-brightness side and thus obtain a contrasted-density well-balanced image.

In the above explanation, the lightness of the high-brightness area of the image is judged with three levels in (1) highlight point judgment. However, to obtain the further optimum gradation curve, it is possible to further increase the number of levels of classification (e.g., four or more levels) for performing the detailed judgment. Furthermore, to perform more detailed judgment in (2) histogram balance judgment and (3) shadow point judgment, it is possible to increase the number of levels of classification.

(LUT Creation)

After the above gradation curve judgment process (step S112 in FIG. 11) ended, in a step S113 of FIG. 11, the LUT for the brightness correction is created based on the parameter for forming the gradation curve obtained in the gradation curve judgment process.

Figure 17:
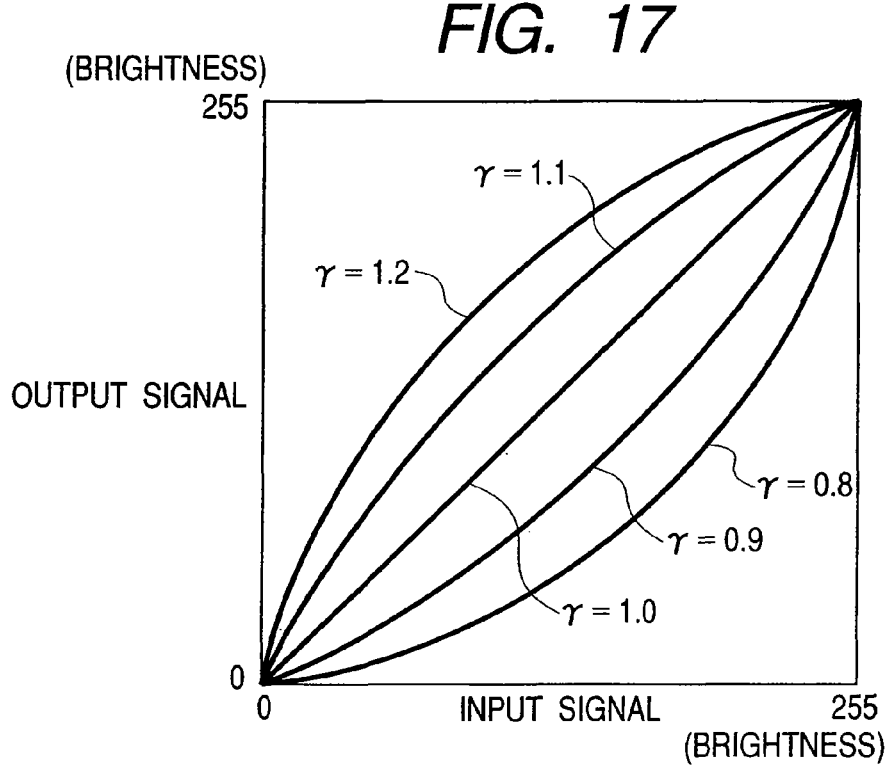
FIG. 17 is a diagram showing conversion characteristic curves (exponential functions) according to gamma values on a brightness correction table.
Figure 18:
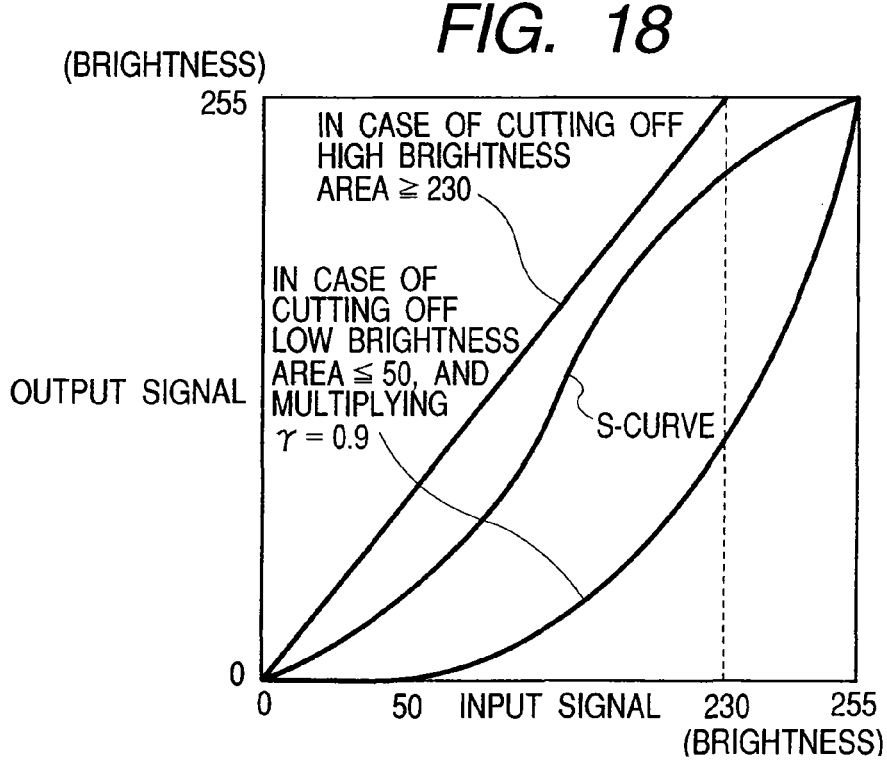
FIG. 18 is a diagram showing conversion characteristic curves (five-dimensional curves) on the brightness correction table, other than simple gamma correction.

On the LUT in the embodiment, the gradation curve obtained as above is recorded as an exponential function and a quintic function. That is, in case of simply performing only the gamma correction, the exponential function (FIG. 17) is used, while in case of performing the correction using the straight line for cutting off the high-brightness or low-brightness area and more complicated curves, the quintic function (FIG. 18) is used.

That is, in case of using the exponential function for performing only the gamma correction, if it is assumed that an input brightness signal is Y and an output brightness signal is Y', an LUT L[Y] performs the conversion represented by the equation $Y'=255\times[(Y/255)1/\gamma]$, whereby the gamma value is given based on the judgment result.

On the other hand, in case of using the quintic function, the LUT performs the conversion represented by the equation $Y'=A+B\times Y+C\times Y^2+D\times Y^3+E\times Y^4+F\times Y^5$. In this case, by applying the coefficients A, B, C, D, E and F, the quintic function completes. Here, it should be noted that the LUT is dynamically created, that is, the LUT is created in regard to each process for the processing-target image. By dynamically creating such a correction table as above, it is possible to reduce the necessary memory amount.

It is of course possible to statically prepare the LUT beforehand on the memory in regard to each gradation curve, instead of dynamically creating it.

(Correction)

Next, in a step S114 shown in FIG. 11, the brightness signal Y is corrected. That is, the brightness value Y of the input image is converted as Y'=L[Y] by the created LUT L[Y].

Furthermore, the brightness-corrected brightness signal Y' and the color difference signals Cr and Cb of the input image are returned to the R, G and B signals, and then the corrected R', G' and B' image signals are thus generated.

According to the embodiment, on the histogram, since the component value that the accumulated frequency from the maximum or minimum value represents the predetermined value is obtained within the range of the component value concerning the lightness of the image data, it is possible to know the entire lightness of the image. Furthermore, since the rate of the accumulated frequency from the minimum or maximum value up to the predetermined component value to the number of the total pixels on the histogram is obtained, it is possible to know the distributions of the lightness of the image. Then, the lightness distribution is judged based on the component value and the rate, and the gradation curve for the correction is obtained based on the judged result, whereby the correspondence of the lightness distribution and the correction gradation curve can be made different in regard to each entire lightness of the image.

That is, it is possible to finally select, from the plural correction gradation curves, one correction gradation curve optimum for the image in question by using the three parameters of the highlight point, the balance of the histogram, and the shadow point.

Thus, for example, in regard to the image which is entirely dark, it is possible to decrease the distribution showing the dark range by the distribution of the lightness corresponding to the correction to further lighten the image (i.e., the correction to further lower the density on the print image), whereby it is possible to obtain more preferable balance of the lightness on the print image. On the other hand, in regard to the image which is entirely light, it is possible to increase the density on the print image by darkening it. Thus, it is possible to compensate a density output characteristic of a print device that this device can essentially achieve only low-density printing, whereby it is possible by this print device to print an image of entirely high density. Furthermore, in regard to the image of which the dynamic range is essentially narrow, it is possible, by expanding this range, to enhance the contrast of the entire image to be printed and thus obtain a sightly print image.

It should be noted that, although the judgment is performed in the order shown in FIG. 12 in the embodiment, the order may be appropriately changed.

Furthermore, the highlight point HLP and the shadow point SDP need not necessarily be obtained by the above methods. That is, known methods may be appropriately used to obtain them.

Incidentally, as described above, the highlight point is used to check the lightness distribution in the high-brightness area and the shadow point is used to check the lightness distribution in the low-brightness area in the embodiment. However, for example, if the details of the lightness distribution in the high-brightness area can be checked by a parameter other than the highlight point, it is of course possible to use this parameter instead of the highlight point. That is, it is possible to obtain the rate of the accumulated frequency from the maximum value up to a certain brightness value (e.g., 220) to the number of the total pixels on the histogram and then judge the lightness distribution in the high-brightness area based on the obtained rate. In this case, as well as the highlight point, the plural thresholds are provided for that parameter to perform so-called classification judgment. Of course, in the low-brightness area, it is possible to obtain, instead of the shadow point, the rate of the accumulated frequency from the minimum value up to a certain brightness value (e.g., 30) to the number of the total pixels on the histogram and then judge the lightness distribution based on the obtained rate.

Furthermore, in the above embodiment, the correction concerning the brightness value Y is explained. On one hand, the same correction may be performed directly to the R, G and B signals. In this case, the above LUT can be used for the correction in the state that R, G and B are used instead of Y and R', G' and B' are used instead of Y'. Incidentally, since the RGB/YCrCb conversion is not necessary when the R, G and B signals are corrected, it is possible to increase the processing speed.

When exposure setting is in an automatic mode, the above process is automatically added. Here, for example, if the exposure setting is in the automatic mode and a change amount from the reference value is known, the above process may be modified according to the known amount.

That is, when the thresholds of HLP, S128 and SDP shown in FIG. 13 are set, the exposure value of the shooting condition data 106 is used. For example, if the exposure value is smaller than the reference value, the thresholds in FIG. 13 are changed so that the correction to entirely lighten the image can be easily performed, whereby it is possible to correct the darkly shot image to become appropriately light. On the other hand, if the exposure value is larger than the reference value, there is the fear that the image is overexposed, whereby it only has to change the thresholds in FIG. 13 so as to lower the lightness of the image as a whole.

(Manual Mode Notification Function)

Next, the contents of the process by the image correction processing unit 113 will be explained. That is, first, the information concerning white balance, exposure and on/off of stroboscopic light emission is read from the shooting condition data 106, and the image correction is performed if an automatic shooting mode is set. However, in a case where a manual shooting mode is set, if the image correction is automatically performed as above, an image against user's intention is output. Therefore, in the case where the manual shooting mode is set, it is necessary to notify a user whether or not to perform the automatic correction process.

In a recent digital still camera, plural kinds of white balances are previously prepared in regard to the automatic shooting mode and the manual shooting mode (fine weather, cloudy weather, tungsten lamp, fluorescent lamp, etc.). When the user selects the setting other than the automatic setting, he needs to select the mode suitable for the shooting condition, whereby the user's intention is faithfully reflected in the shot image. Incidentally, in a case where the shot image of this type is output by using a monitor or a printer, there is a possibility that the output image is not matched with the user's intention if the image correction process is automatically performed. Therefore, when the shooting setting is the manual setting, the image correction is not automatically performed, and alternatively it is necessary to confirm the user whether or not to actually perform the process.

Similarly, the user himself can set the exposure in the manual shooting mode. Therefore, also in this case, it is necessary to confirm the user whether or not to perform the image correction so that the output image is matched with the user's intention.

Therefore, if the information representing that the white balance and/or the exposure are manually set is obtained from the shooting condition data 106, it causes the monitor of the personal computer to display whether or not the automatic image correction is possible. If the automatic image correction is possible, the process as in the past is performed. On the other hand, if it is designated by the user that the automatic image correction is not possible, the correction process to the image in question is not performed. Here, it should be noted that how to notify the user of the confirmation is not limited to the display on the monitor of the personal computer. That is, for example, it is possible to notify the user of the confirmation by causing the body of the printer to turn a warning lamp on.

Incidentally, it is necessary to also think about the following cases.

Even if the user intentionally shoots an image in the manual shooting mode, there is the fear that setting errors of the white balance and/or the exposure occur. For example, it is assumed that, in the daytime, the user shoots the image in the open air. In this case, there is the fear that, although the exposure has been darkly set, the intended exposure cannot be obtained, and the obtained image is overexposed. Further, there is the fear that, since forced off of a stroboscope has been manually set, the shot image is dark due to an insufficient light amount.

On one hand, when the user shoots by error the image in the manual shooting mode rather than the automatic shooting mode, there is the fear that a failed image is output. For example, in a case where the white balance previously set under the cloudy weather is maintained as it is, if the user shoots the image indoors with a fluorescent lamp lighted without changing the white balance, there is the fear that the above failed image is output.

As previously described, when the user shoots the image in the manual shooting mode, there is the fear that the shot image is corrected against the user's intention if the automatic image correction process is performed. Here, in the case the image shot in the manual shooting mode is output as the failed image, the automatic image correction process is not ordinarily performed. That is, also in such a situation, it is necessary to confirm the user whether or not to perform the automatic image correction process.

In other words, when the image shot in the manual shooting mode is the image in which the user's intention is reflected, it only has to select not to perform the automatic image correction process. On the other hand, when the image shot in the manual shooting mode is the image against the user's intention, it only has to select to perform the automatic image correction process. To do so, when the image shot in the manual shooting mode is output by the monitor or the printer, it is necessary to confirm the user whether or not to perform the automatic image correction process.

Furthermore, recently, there is service in which, by an operator (not the shooter) in a processing laboratory, the image correction process is performed to the image data shot by the shooter with the digital still camera and then the processed image data is actually printed. In this case, if the operator manually performs the image correction process, the shooter's intention is not reflected in the shot image. That is, it is necessary to give the operator a warning about the image which was shot in the manual shooting mode.

As above, in these cases, when the image shot in the manual shooting mode is output by the monitor or the printer, it is necessary to notify that the image in question was shot in the manual shooting mode, and also it is necessary to confirm the user whether or not to perform the automatic image correction process. Furthermore, when the operator other than the shooter performs the image correction process, it is necessary to give the operator the warning about the image which was shot in the manual shooting mode.

Figure 19:
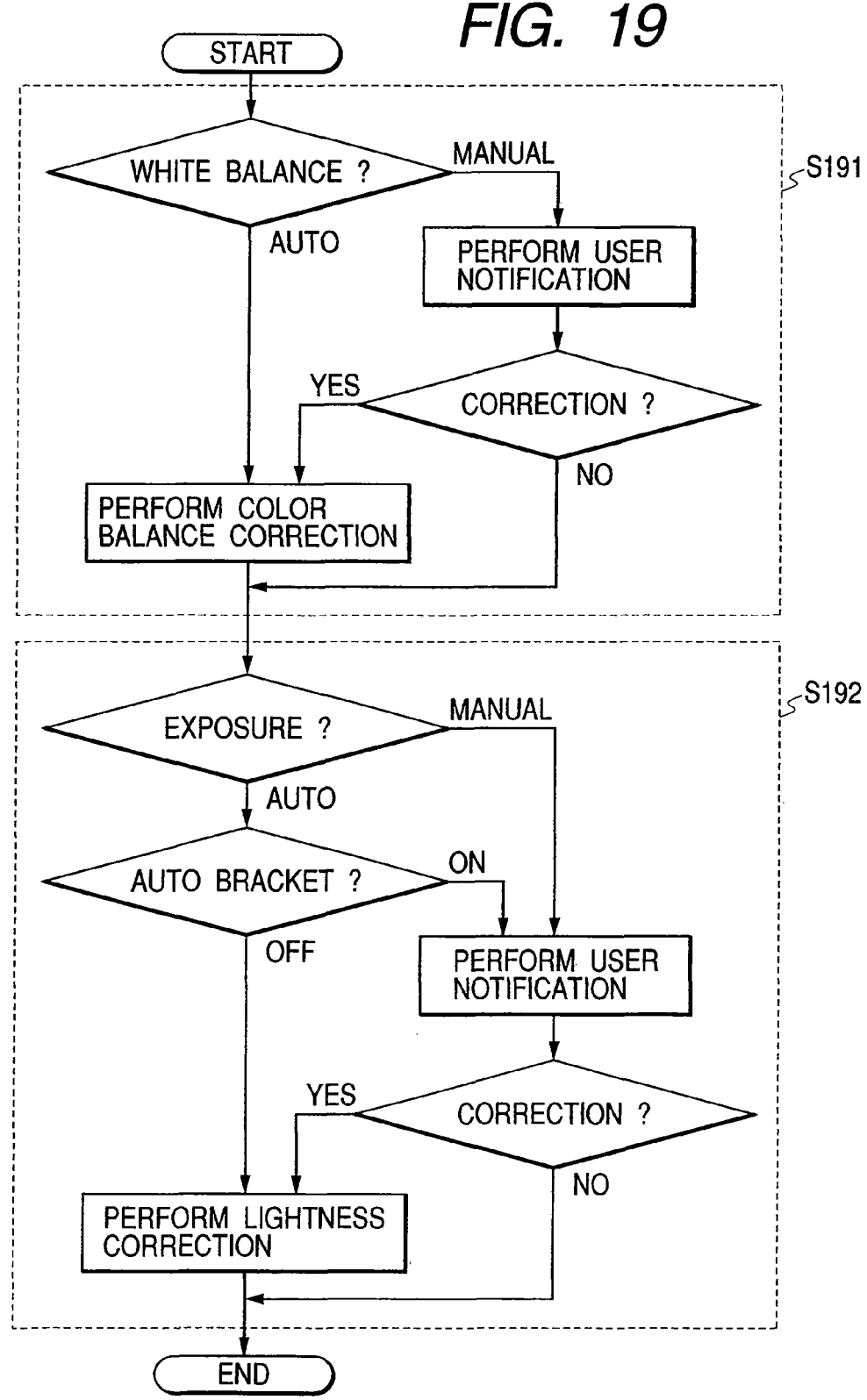
FIG. 19 is a flow chart showing a smoothing process to be performed based on digital zoom information.

Incidentally, it should be noted that the process in the embodiment is shown in a flow chart of FIG. 19. That is, FIG. 19 shows that the color balance correction is performed in a step S191, and the lightness correction is performed in a step S192.

(Auto Bracket Function ON/OFF)

Next, an auto bracket function which has been adopted in some kinds of cameras will be explained. According to the auto bracket function, if a shutter of the camera is released, a subject is once shot at a standard exposure value, the exposure value is automatically shifted in plus and minus directions respectively, and the subject is again shot respectively at the shifted exposure values. That is, by releasing the shutter once, the subject can be shot at the different three kinds of exposure values. In the case where the auto bracket function is activated, the user intentionally changes the lightness and shoots the subject, whereby it is necessary to confirm the user whether or not the automatic image correction process should be performed, as shown in the step S192 of FIG. 19.

Hereinafter, examples of the concrete display method and the UI will be explained with reference to the attached drawings.

Figure 22:
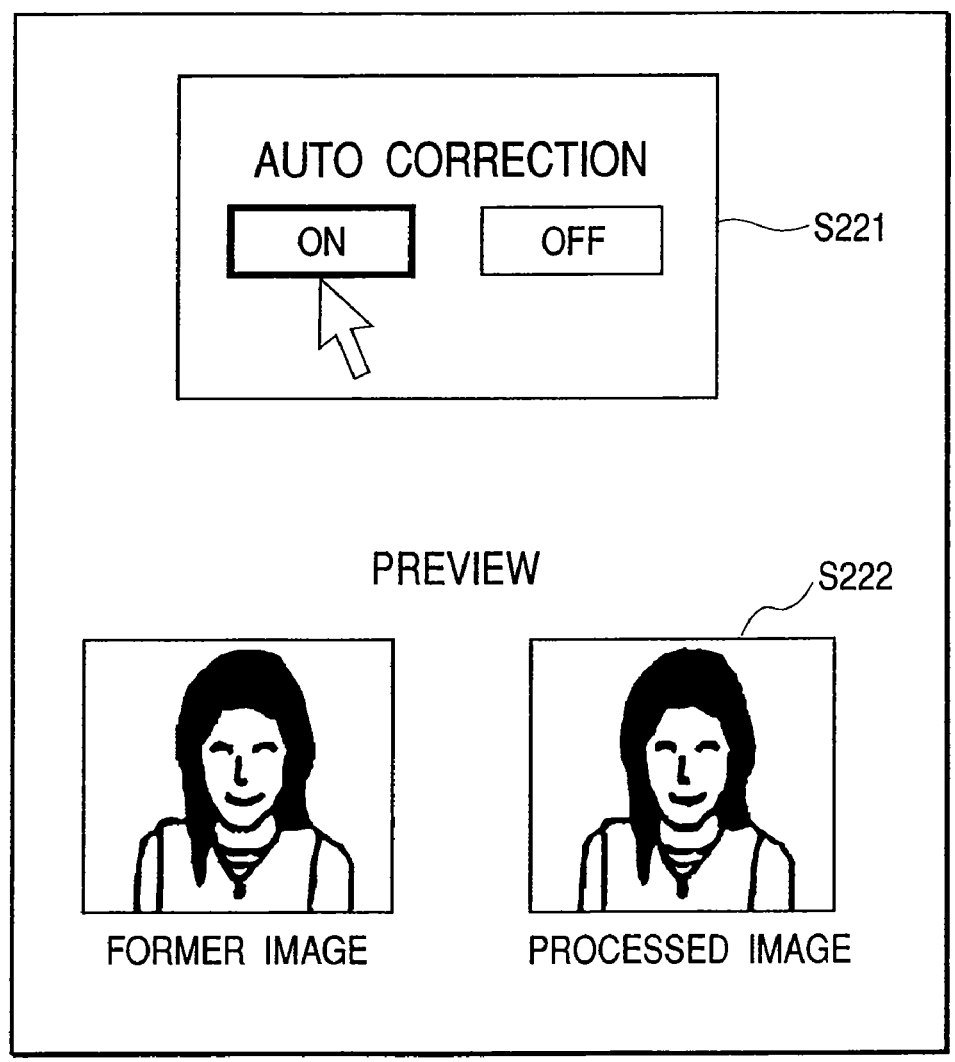
FIG. 22 is a diagram showing an automatic correction confirmation user interface and image preview display.

First, when the image which was shot in the manual shooting mode is unfolded according to an application program (software), as shown in a step S221 of FIG. 22, the program causes the user to select on a UI screen whether or not the automatic image correction process should be performed. That is, the automatic image correction process is performed if the user selects an ON button on the UI screen, but the automatic image correction process is not performed if the user selects an OFF button on the UI screen. Here, it should be noted that the UI screen may be displayed not only when the shot image is unfolded according to the application program but also when print setting is performed.

Next, if the ON button is selected, as shown in a step S222 of FIG. 22, a preview display is performed on the UI screen. For example, a former image which is not yet correction-processed and a processed image which has been already correction-processed are lined up on the preview display so that the user can confirm the result of the image correction process. By doing so, if the processed image acts counter to the user's intention, the user can again select the OFF button to cancel the automatic image correction process.

Furthermore, for example, in a case where the image of which the white balance and the exposure have been both adjusted in the manual shooting mode is displayed and previewed, plural kinds of preview displays may be achieved, so that the user can select one image suitable for his intention while watching the UI screen. More specifically, by doing so, it is possible to perform the automatic image correction process only for the white balance and maintain the exposure as it is, and also it is possible to perform the automatic image correction process only for the exposure and maintain the white balance as it is. Therefore, it is possible to more precisely and adequately correct the shot image in which one of the white balance and the exposure has been failed in adjustment.

Incidentally, when the plural images shot by the digital camera are unfolded according to the application program, there is a method of displaying these images as thumbnail images. In this method, as shown in a step S232 of FIG. 23, markers are appropriately added so that the user can immediately judge which images have been shot in the manual shooting mode. By doing so, for example, in a case where the plural images are displayed and printed all at once, the user can judge at one view which images have been shot in the automatic shooting mode and thus subjected to the automatic image correction process, and which images have been shot in the manual shooting mode and thus are not yet processed. Furthermore, in a case where a person (e.g., an operator in a processing laboratory) other than the shooter performs the image correction process to the plural images in due order, he can easily confirm which images have been shot in the manual shooting mode and which images should be processed.

Figure 23:
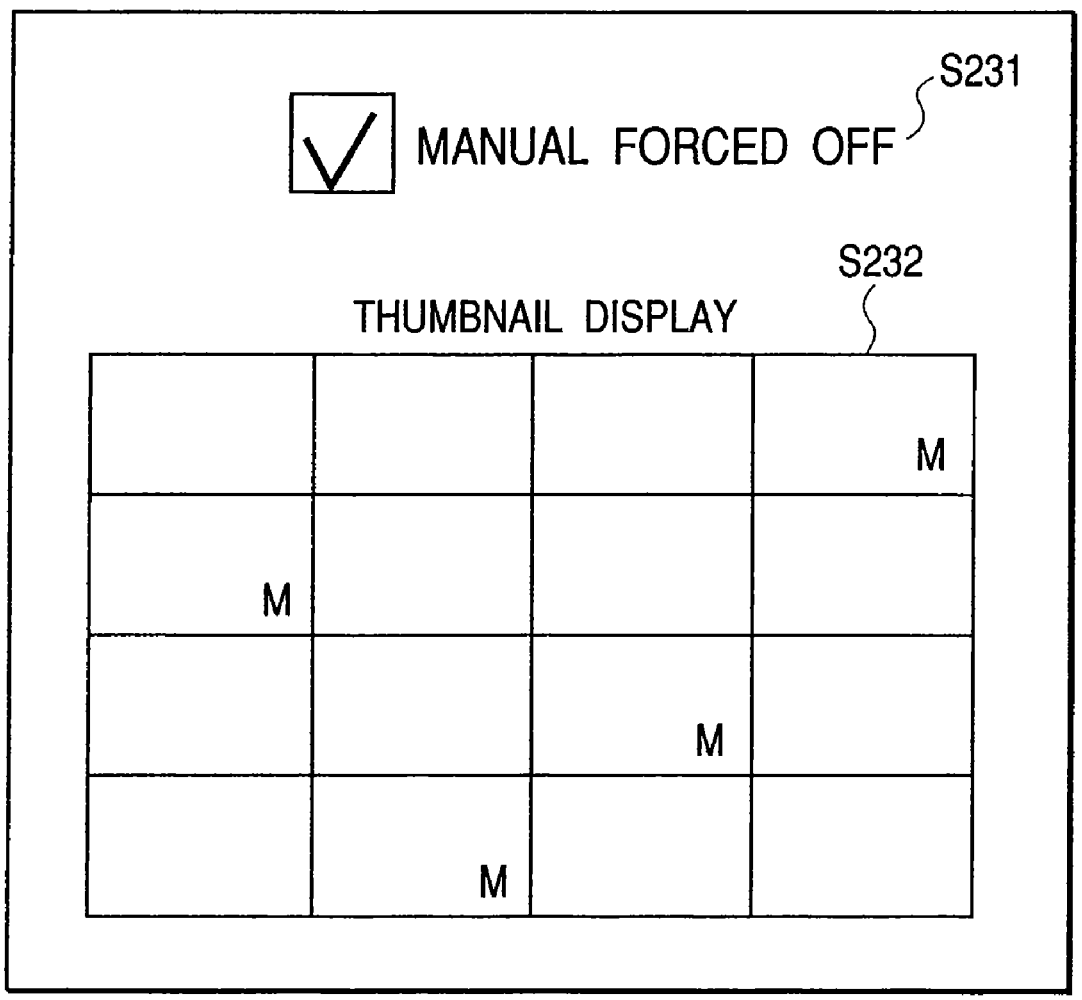
FIG. 23 is a diagram showing a check box and image thumbnail display.

Incidentally, for example, there is a case where the user wishes to perform the automatic image correction process to all the images irrespective of the shooting mode (automatic shooting mode and manual shooting mode), whereby it is possible to provide a function to forcedly inactivate the manual shooting mode. For example, a check box "MANUAL FORCED OFF" as shown in a step S231 of FIG. 23 is provided so that the user can check activation/inactivation of the manual shooting mode. That is, if the user checks the check box "MANUAL FORCED OFF", the information representing that the image in question has been shot in the manual shooting mode is disregarded, whereby the automatic image correction process can be performed to all the images.

As concretely explained above, in the case where the image shot by the digital camera is processed according to the application program (software), if the image in question has been shot in the manual shooting mode, the program causes the user to confirm whether or not to perform the automatic image correction process to this image and causes the screen to perform the preview display of this image, whereby it is possible to compare the former image and the processed image with each other.

Furthermore, when the shot images are displayed as the thumbnail images, the markers are appropriately added to the images shot in the manual shooting mode, whereby it is possible to judge at one view which images have been shot in the automatic shooting mode.

Moreover, the function to forcedly inactivate the manual shooting mode is added, whereby it is possible to perform the automatic image correction process to all the images in a lump irrespective of whether or not the images have been shot in the manual shooting mode.

Then, it is assumed that the color balance correction and the lightness correction are made independent of each other and the user notification is issued from the shooting condition data 106. That is, when the exposure is automatically set and the white balance is manually set, the lightness correction is automatically performed, and the notification to urge the user to determine whether or not the color balance correction is necessary is issued through the personal computer. Therefore, the automatic image correction process in which the user's intention is sufficiently reflected is performed so that the setting established when the image was shot is not spoiled, whereby higher-precision correction can be achieved.

Figure 20:
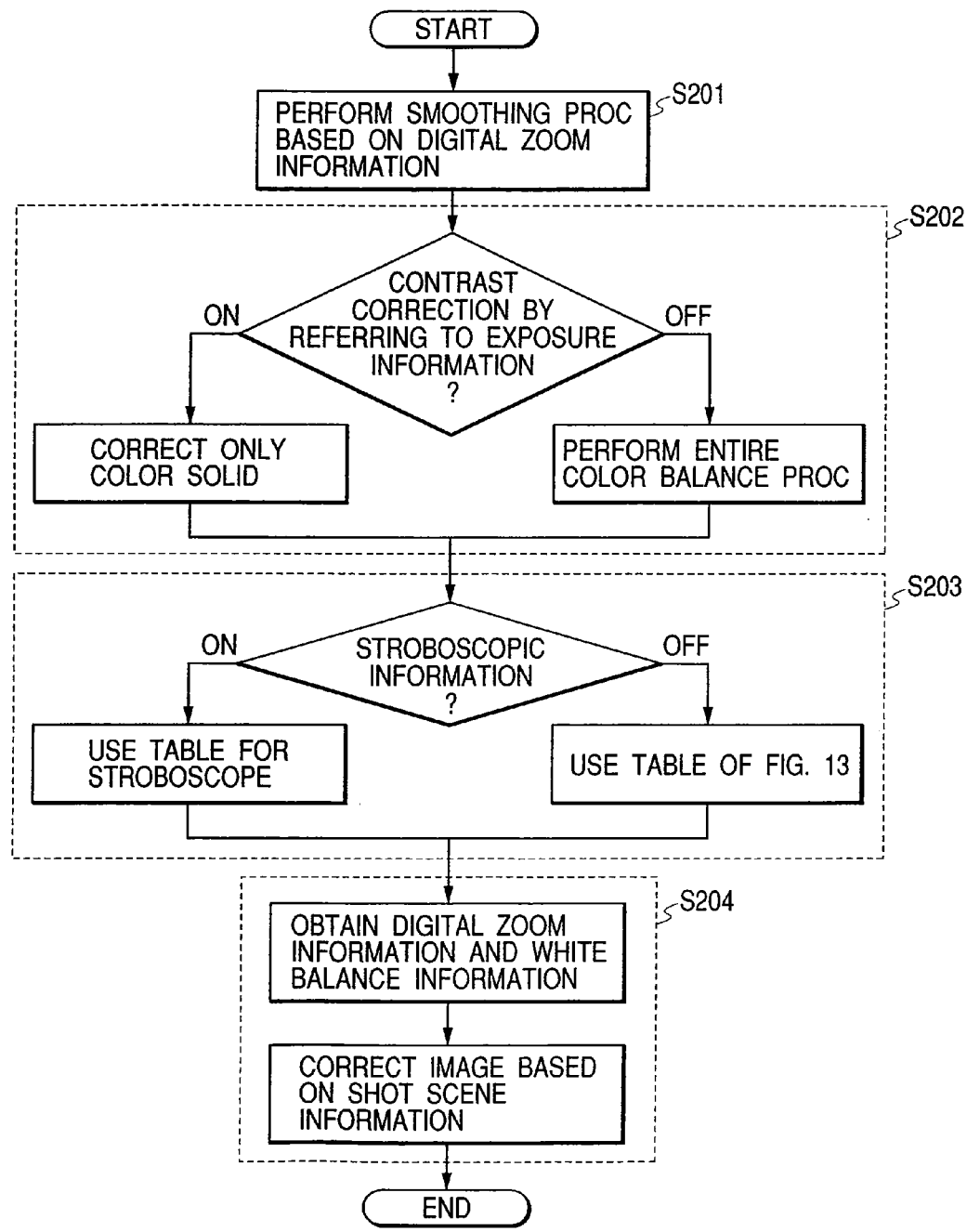
FIG. 20 is a flow chart showing restrictions in case of performing plural image correction processes based on shooting condition data.

Incidentally, FIG. 20 is a flow chart showing the restrictions in case of performing the plural image correction processes based on the shooting condition data. In FIG. 20, a smoothing process is performed based on digital zoom information in a step S201, it is judged in a step S202 whether or not the contrast should be emphasized, and it is further judged in a step S203 whether or not stroboscopic information is activated, and finally a storage color reproduction correction process is performed based on shot scene information in a step S204. Thus, in a case where the plural image correction processes are performed, the priority order is given to each of the processes, and further these processes are weighted respectively according to the various conditions, whereby the restrictions are applied so that, e.g., if one process is performed, other process is not performed. Thus, the reasonable and effective image correction process can be further achieved.

(Other Embodiment)

In the above embodiment, the shooting condition information is displayed on the UI screen. However, the present invention is not limited to this. For example, it is possible to display by turning on/off a predetermined lamp that the shooting condition information is correctly recognized and used.

Furthermore, the present invention is not limited to the above first and second processing methods, that is, various modifications can be achieved within the scope not depart from the concept of the present invention.

Moreover, the digital still camera is used as the input means (obtaining means) of the image by way of example, but the present invention is not limited to this. For example, the present invention is applicable to various input devices such as a digital video camera, an image scanner, a film scanner and the like.

Moreover, it is needless to say that the first and second processing methods can be achieved in a case where a storage medium storing program codes of software to achieve the functions of the host computer and the terminal device executing the first and second processing methods is supplied to a system or an apparatus, and then a computer (or CPU or MPU) in the system or the apparatus reads and executes the program codes stored in the storage medium.

In this case, the program codes themselves read from the storage medium achieve the functions of the host computer and the terminal device executing the first and second processing methods, whereby the storage medium storing the program codes and the program codes themselves constitute the present invention.

As the medium such as the storage medium for supplying the program codes, for example, a ROM, a flexible disk, a hard disk, an optical disk, a magnetooptical disk, a CD-ROM, a CD-R, a magnetic tape, a non-volatile memory card, or the like can be used.

Furthermore, it is needless to say that the present invention includes not only a case where the functions of the first and second methods are achieved by executing the program codes read by the computer, but also a case where an OS or the like functioning on the computer executes all the process or a part thereof according to the instructions of the program codes, thereby achieving the functions of the first and second methods.

Moreover, it is needless to say that the present invention includes a case where the program codes read from the medium such as the storage medium are once written in a memory provided in a function expansion board inserted in the computer or a function expansion unit connected to the computer, then a CPU or the like provided in the function expansion board or the function expansion unit executes all the process or a part thereof according to the instructions of the written program codes, thereby achieving the functions of the first and second embodiments.

Figure 21:
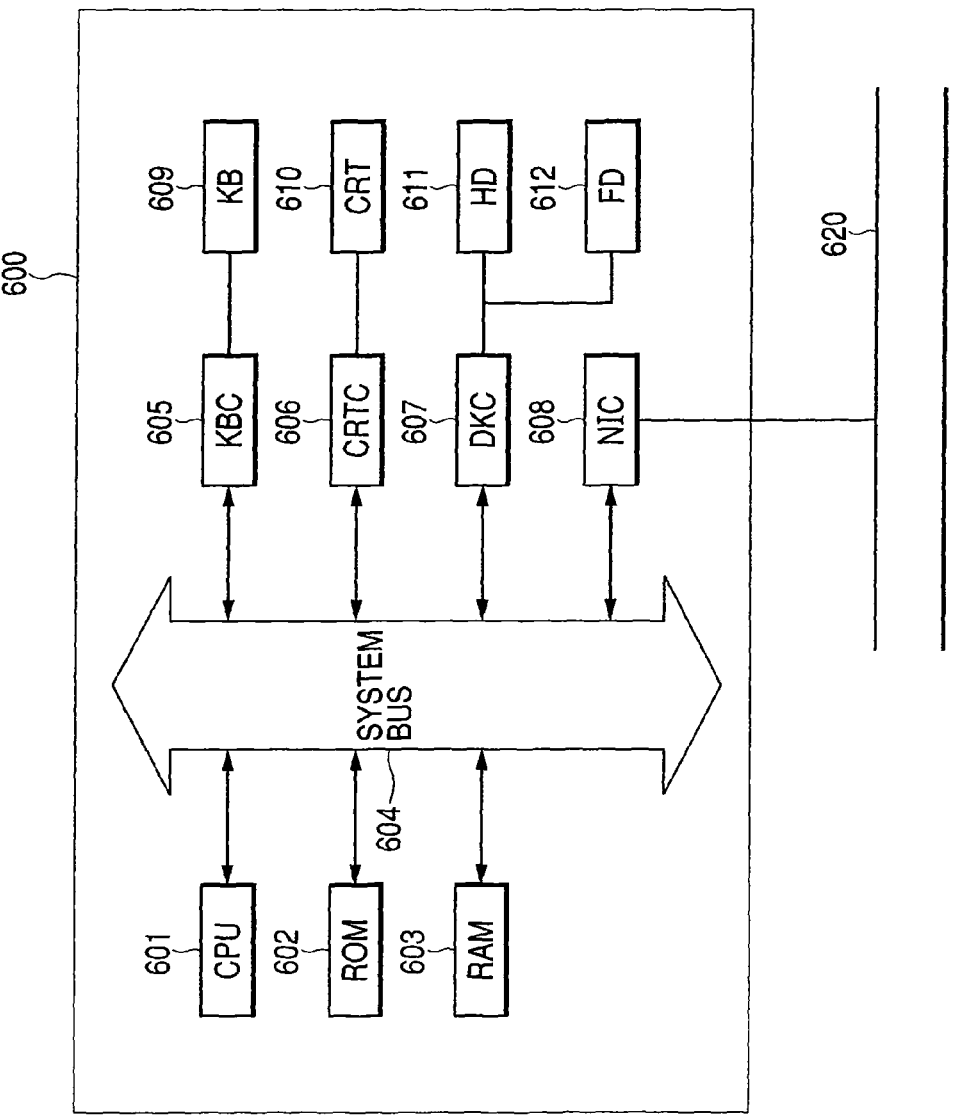
FIG. 21 is a block diagram showing functions of a computer.

FIG. 21 is a block diagram showing a function 600 of the above computer.

In the computer function 600, as shown in FIG. 21, a CPU 601, a ROM 602, a RAM 603, a keyboard controller (KBC) 605 for a keyboard (KB) 609, a CRT controller (CRTC) 606 for a CRT display (CRT) 610 functioning as the display unit, a disk controller (DKC) 607 for a hard disk (HD) 611 and a flexible disk (FD) 612, and a network interface controller (NIC) 608 for connection with a network 620 are wholly connected together so that these structural components can mutually communicate with others through a system bus 604.

The CPU 601 wholly controls each structural component connected to the system bus 604, by executing the software stored in the ROM 602 or the HD 611 or executing the software supplied from the FD 612.

That is, the CPU 601 performs the control to achieve the operations in the embodiment by reading the processing program according to a predetermined processing sequence from the ROM 602, the HD 611 or the FD 612 and executing the read program.

The ROM 603 functions as a main memory or a working area and the like of the CPU 601.

The KBC 605 controls the instruction input from the KB 609, a not-shown pointing device and the like.

The CRTC 606 controls the display by the CRT 610.

The DKC 607 controls the access to the HD 611 and the FD 612 which store a boot program, various application programs, editing files, user files, network administration programs, the predetermined processing programs in the embodiment, and the like.

The NIC 608 bi-directionally exchanges the data with the devices on the network 620 or the system.

As explained above, according to the present invention, the condition information (shooting condition information, etc.) added to the image information (image information obtained in the shooting by the digital still camera, etc.) of the processing-target image is analyzed, and the image process (image correction process, etc.) is performed to the image information on the basis of the result of the analysis, whereby it is possible to perform the image process according to the condition at the time of obtaining the processing-target image. Thus, it is possible to provide the excellent processed image intended by the user.

More specifically, in the digital still camera, the color balance correction is performed based on the white balance information, and the lightness correction is performed based on the exposure information and the auto bracket information. Furthermore, if the manual setting is established, the automatic image correction is not directly performed. That is, the notification to confirm whether or not the correction process is necessary is issued to the user, and the correction process is actually performed only when it is designated by the user that the correction process is necessary. By doing so, the condition which was set by the user at the time of shooting is not spoiled, and the user's intention is sufficiently reflected in the output image.

As many apparently and widely different embodiments of the present invention can be made without departing from the spirit and scope thereof, it is to be understood that the invention is not limited to the specific embodiments thereof expect as defined in the appended claims.

What is claimed is:

1. An image processing apparatus which performs an image process on an image to which condition information representing a condition at a time when an image was shot has been added, said image processing apparatus comprising:
    an analyzing unit configured to analyze condition information indicating whether the image was shot in a manual mode or in an automatic mode, the condition information representing a condition at a time when the image was shot and having been added to the image;
    a processing determining unit configured to determine an image processing condition based on an analysis result by said analyzing unit; and
    a processing unit configured to perform, to the image, a process according to the image processing condition determined by said processing determining unit,
    wherein, in a case where it is analyzed by said analyzing unit that the image was shot in the manual mode, (a) said image processing apparatus permits a user to choose whether or not to perform the process by said processing unit, (b) in a case where an instruction to perform the process is input by the user based on that choice, said processing unit performs the process, and (c) in a case where an instruction to perform the process is not input by the user based on that choice, said processing unit does not perform the process, and
    wherein in a case where it is analyzed by said analyzing unit that the image was shot in the automatic mode, said processing unit performs the process without causing the user to choose whether or not to perform the process by said processing unit.

2. An image processing apparatus according to claim 1, further comprising an outputting unit configured to output the image which has been processed by said processing unit.

3. An image processing apparatus according to claim 2, wherein said outputting unit includes a print output function.

4. An image processing apparatus to claim 1, wherein
    the image processing condition includes a correction amount of color balance of the image,
    the lightness of a highlight point of the image and the lightness of a shadow point thereof are detected by said processing determining unit configured to obtain the correction amount of the color balance of the image,
    colors of the highlight point and the shadow point are obtained from plural pixels having said lightness, and
    the process in said processing unit is color correction, and the color correction is performed to the image based on the highlight point, the shadow point and the colors of these points.

5. An image processing apparatus according to claim 4, wherein, in the color correction, a color solid axis of the image is conformed to an axis indicating the lightness, and contrast adjustment is performed to color components representing the lightness of the image.

6. An image processing apparatus according to claim 4, wherein, in the color correction, the correction process is performed to color components representing the color of the image, and thus saturation of the image is adjusted.

7. An image processing apparatus according to claim 4, further comprising a histogram creating unit configured to create a histogram based on color components representing the lightness of the image,
    wherein the highlight point and the shadow point are detected based on the histogram.

8. An image processing apparatus according to claim 1, wherein the image includes an image obtained by a digital still camera.

9. An image processing apparatus according to claim 1, wherein
    the condition information includes at least any of exposure information, stroboscope information, white balance information, shooting mode information, digital zoom information and auto bracket information at a time when the image is shot.

10. An image processing apparatus according to claim 1, further comprising a presenting unit configured to present information concerning the condition information.

11. An image processing apparatus according to claim 10, wherein said presenting unit presents the information concerning the condition information based on processing timing of the image to which the condition information has been added.

12. An image processing apparatus according to claim 1, wherein said analyzing unit includes a function to analyze the image.

13. An image processing apparatus according to claim 1, wherein notification that a user is permitted to choose whether or not to perform the process by said processing unit is performed by a notifying unit when the one or more images are displayed.

14. An image processing apparatus according to claim 1, further comprising a canceling unit configured to cancel the condition information in the case where the image is obtained based on the manual setting of the image obtainer.

15. An image processing apparatus according to claim 1, wherein
the process performed by said processing unit is an automatic image correction process, and
a notifying unit permits a user to choose whether or not to perform the automatic image correction process.

16. An image processing apparatus according to claim 1, wherein, in case of opening, by application software, the image to which the condition information has been added or in case of printing the image to which the condition information has been added, a notifying unit permits a user to choose, whether or not to perform the process by said processing unit.

17. An image processing method which performs an image process on an image to which condition information representing a condition at a time when an image was shot has been added, said image processing method comprising:
an analysis step of analyzing condition information indicating whether or not the image was shot in a manual mode or in an automatic mode, the condition information representing a condition at a time when the image was shot and having been added to the image;
a processing determination step of determining an image processing condition based on an analysis result in said analysis step; and
a processing step of performing, on the image, the process according to the image processing condition determined in said processing determination step,
wherein, in a case where it is analyzed in said analysis step that the image was shot in the manual mode, (a) said image processing method permits a user to choose whether or not to perform the process in said processing step, (b) in a case where an instruction to perform the process is input by the user based on that choice, said processing step performs the process, and (c) in a case where the instruction to perform the process is not input by the user based on that choice, said processing step does not perform the process, and
wherein in a case where it is analyzed in said analysis step that the image was shot in the automatic mode, said processing step performs the process without causing the user to choose whether or not to perform the process.

18. An image processing method according to claim 17, further comprising an image obtaining step of obtaining the image through shooting of the image by a digital still camera.

19. An image processing method according to claim 17, wherein
the image information includes shot image information, and
the condition information includes at least any of exposure information, stroboscope information, white balance information and shooting mode information at a time when the shot image information is obtained.

20. An image processing method according to claim 17, wherein
the process performed in said processing step is an automatic image correction process, and
a notification step permits a user to choose whether or not to perform the automatic image correction process.

21. An image processing method according to claim 17, wherein, in case of opening, by application software, the image to which the condition information has been added or in case of printing the image to which the condition information has been added, a notification step permits a user to choose whether or not to perform the process in said processing step.

22. A computer-readable medium encoded with a computer program to perform an image process on an image to which condition information representing a condition at a time when an image was shot has been added, said storage medium storing:
a code for analyzing condition information indicating whether or not the image was shot in a manual mode or in an automatic mode, the condition information representing a condition at a time when the image was shot and having been added to the image;
a code for determining an image correction condition based on an analysis result by said code for analyzing the condition information; and
a code for performing, on the image, the process according to the determined image correction condition,
wherein, in a case where it is analyzed by said code for analyzing the condition information that the image was shot in the manual mode, (a) said computer program permits a user to choose whether or not to perform the process according to said code for performing the process, (b) in a case where an instruction to perform the process is input by the user based on that choice, said code for performing the process performs the process, and (c) in a case where the instruction to perform the process is not input by the user based on that choice, said code for performing the process does not perform the process, and
wherein in a case where it is analyzed by said code for analyzing that the image was shot in the automatic mode, said code for performing the process performs the process without causing the user to choose whether or not to perform the process.

* * * * *